United States Patent
Jeong et al.

(10) Patent No.: US 11,044,407 B2
(45) Date of Patent: Jun. 22, 2021

(54) IMAGE SENSOR AND ELECTRONIC DEVICE INCLUDING THE IMAGE SENSOR, AND METHOD OF IMAGE ZOOM PROCESSING

(71) Applicant: SAMSUNG ELECTRONICS CO., LTD., Suwon-si (KR)

(72) Inventors: Il Yun Jeong, Hwaseong-si (KR); Je Suk Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 16/359,153

(22) Filed: Mar. 20, 2019

(65) Prior Publication Data
US 2020/0077026 A1 Mar. 5, 2020

(30) Foreign Application Priority Data

Aug. 29, 2018 (KR) .................. 10-2018-0101965

(51) Int. Cl.
| | |
|---|---|
| *H04N 5/232* | (2006.01) |
| *H04N 1/393* | (2006.01) |
| *H04N 1/21* | (2006.01) |
| *H04N 19/42* | (2014.01) |

(52) U.S. Cl.
CPC ....... *H04N 5/23296* (2013.01); *H04N 1/2112* (2013.01); *H04N 1/3935* (2013.01); *H04N 19/42* (2014.11)

(58) Field of Classification Search
CPC ............ H04N 5/23296; H04N 1/3935; H04N 1/2112; H04N 19/42; H04N 5/23245; H04N 5/345; H04N 1/648
See application file for complete search history.

(56) References Cited

U.S. PATENT DOCUMENTS

| | | | |
|---|---|---|---|
| 7,852,405 B1 | 12/2010 | Yeh | |
| 9,955,071 B2 | 4/2018 | Deever | |
| 2006/0126082 A1* | 6/2006 | Choi | H04N 1/2112 358/1.2 |
| 2011/0069206 A1 | 3/2011 | Legall et al. | |
| 2014/0118577 A1* | 5/2014 | Masuda | H04N 5/232933 348/240.2 |
| 2014/0253542 A1* | 9/2014 | Jung | G06T 19/20 345/419 |
| 2016/0150158 A1 | 5/2016 | Hasan et al. | |
| 2017/0099444 A1* | 4/2017 | Park | H04N 5/232945 |

FOREIGN PATENT DOCUMENTS

| | | |
|---|---|---|
| KR | 10-2016-0038554 A | 4/2016 |
| KR | 10-2016-0061729 A | 6/2016 |
| KR | 10-1653802 B1 | 9/2016 |

\* cited by examiner

*Primary Examiner* — Hung H Lam
(74) *Attorney, Agent, or Firm* — Lee IP Law, PC

(57) ABSTRACT

An image sensor may include a pixel array having an N×M array of merged pixels arranged in a Bayer pattern, each merged pixel including an k*l matrix of unit pixels of a same color, where k and l are integers greater than two; and an image signal processor to process signals output by the pixel array in accordance with a normal mode or a zoom-in mode. In the zoom-in mode, signals from the pixel array may be remosaiced such that signals corresponding to the unit pixels are arranged in a p*q matrix of unit pixels of a same color, wherein p is a non-negative integer that is less than k and q is a non-negative integer less than l, the p*q matrixes being arranged in a Bayer pattern.

20 Claims, 12 Drawing Sheets

<NORMAL MODE>

<ZOOM-IN MODE>

<ZOOM-IN MODE>

<ZOOM-OUT MODE>

IMAGE SENSOR AND ELECTRONIC DEVICE INCLUDING THE IMAGE SENSOR, AND METHOD OF IMAGE ZOOM PROCESSING

CROSS-REFERENCE TO RELATED APPLICATION

Korean Patent Application No. 10-2018-0101965, filed on Aug. 29, 2018, in the Korean Intellectual Property Office, and entitled: "Image Sensor and Electronic Device Including the Image Sensor, and Method of Image Zoom Processing," is incorporated by reference herein in its entirety.

BACKGROUND

1. Field

Apparatuses and methods consistent with example embodiments relate to an image sensor capable of implementing zoom-in and zoon-out electronically, an electronic device including the image sensor, and an image zoom processing method.

2. Description of the Related Art

Electronic devices including an image sensor (e.g., a digital camera, a smart phone, and a camcorder) provide zoom-in and zoom-out functions. To implement the zoom functions, image signal processing (ISP), a lens, or separate zoom-in and zoom-out image sensors may be used. However, using ISP only allows the zoom-in function to be realized with downgraded image quality, while using a lens or separate image sensors is expensive and not compact.

SUMMARY

According to example embodiments, an image sensor may include a pixel array having an N×M array of merged pixels arranged in a Bayer pattern, each merged pixel including an k*l matrix of unit pixels of a same color, where k and l are integers greater than two; and an image signal processor to process signals output by the pixel array in accordance with a normal mode or a zoom-in mode. In the zoom-in mode, signals from the pixel array may be remosaiced such that signals corresponding to the unit pixels are arranged in a p*q matrix of unit pixels of a same color, wherein p is a non-negative integer that is less than k and q is a non-negative integer less than l, the p*q matrixes being arranged in a Bayer pattern.

According to example embodiments, an electronic device may include a pixel array having an N×M array of merged pixels arranged in a Bayer pattern, each merged pixel including an k*l matrix of unit pixels of a same color, where k and l are integers greater than two, a signal processor to process signals output by the array of merged pixels in accordance with a normal mode or a zoom-in mode; and a remosaic processor. In the zoom-in mode, the remosaic processor is to remosaic the pixel array such that signals corresponding to the unit pixels are arranged in a p*q matrix of unit pixels of a same color, wherein p is a non-negative integer that is less than k and q is a non-negative integer less than l, the p*q matrixes being arranged in a Bayer pattern.

According to example embodiments, a method of image zoom processing of an image sensor including a pixel array may include driving a plurality of merged pixels in the pixel array to generate a full resolution image; processing signals output by the pixel array, having an N×M array of merged pixels arranged in a Bayer pattern, each merged pixel including a k*l matrix of unit pixels of a same color, where k and l are integers greater than two, in accordance with a normal mode or a zoom-in mode; and remosaicing, in the zoom-in mode, signals from the pixel array such that signals corresponding to the unit pixels are arranged in a p*q matrix of unit pixels of a same color, wherein p is a non-negative integer that is less than k and q is a non-negative integer less than l, the p*q matrixes being arranged in a Bayer pattern.

According to example embodiments, there is provided an image zoom processing method of an image sensor including a pixel array, a signal processor, and a signal output unit. A plurality of merged pixels disposed in the pixel array are driven to generate a full resolution image. A part of the full resolution image is cropped to generate a normal mode image or a zoom-in mode image. The signal processor remosaics the normal mode image or the zoom-in mode image. The remosaiced normal mode image or zoom-in mode image is output to a host chip of an electronic device.

According to example embodiments, there is provided an image zoom processing method of an image sensor including a pixel array, a signal processor, and a signal output unit. A plurality of merged pixels disposed in the pixel array are driven to generate a full resolution image. A part of the full resolution image is cropped to generate a zoom-out mode image. The signal processor bins the zoom-out mode image. The signal output unit outputs the binned zoom-out mode image to a host chip of an electronic device.

According to example embodiments, there is provided an image zoom processing method of an electronic device including an image sensor. A plurality of merged pixels disposed in a pixel array of the image sensor are driven to generate a full resolution image. A part of the full resolution image is cropped to generate a normal mode image or a zoom-in mode image. The normal mode image or the zoom-in mode image is output to a host chip of the electronic device. The host chip remosaics the normal mode image or the zoom-in mode image.

According to example embodiments, a method of image zoom processing of an image sensor including a pixel array, may include driving a plurality of merged pixels in the pixel array to generate a full resolution image; cropping part of the full resolution image in accordance with a normal mode or zoom-in mode;

binning the full resolution image in accordance with a zoom-out mode; and generating an image signal in accordance with the normal mode, the zoom-in mode, or the zoom-out mode, wherein the image signal has a same resolution for the normal mode, the zoom-in mode, and the zoom-out mode.

According to example embodiments, there is provided an image sensor including a pixel array, a timing generator, a signal processor, and a signal output unit. A plurality of merged pixels are disposed in the pixel array, and all or some of the plurality of merged pixels are driven to generate a normal mode image, a zoom-in mode image, or a zoom-out mode image. The timing generator drives each of the plurality of merged pixels on the basis of a zoom mode input from a user interface. The signal processor remosaics the normal mode image or the zoom-in mode image or bins the zoom-out mode image. The signal output unit outputs the remosaiced or binned image to a host chip of an electronic device.

BRIEF DESCRIPTION OF THE DRAWINGS

Features will become apparent to those of skill in the art by describing in detail exemplary embodiments with reference to the attached drawings in which.

DETAILED DESCRIPTION

Hereinafter, an image sensor, an electronic device including the image sensor, and an image zoom processing method according to example embodiments of the will be described with reference to the accompanying drawings.

Figure 1A:
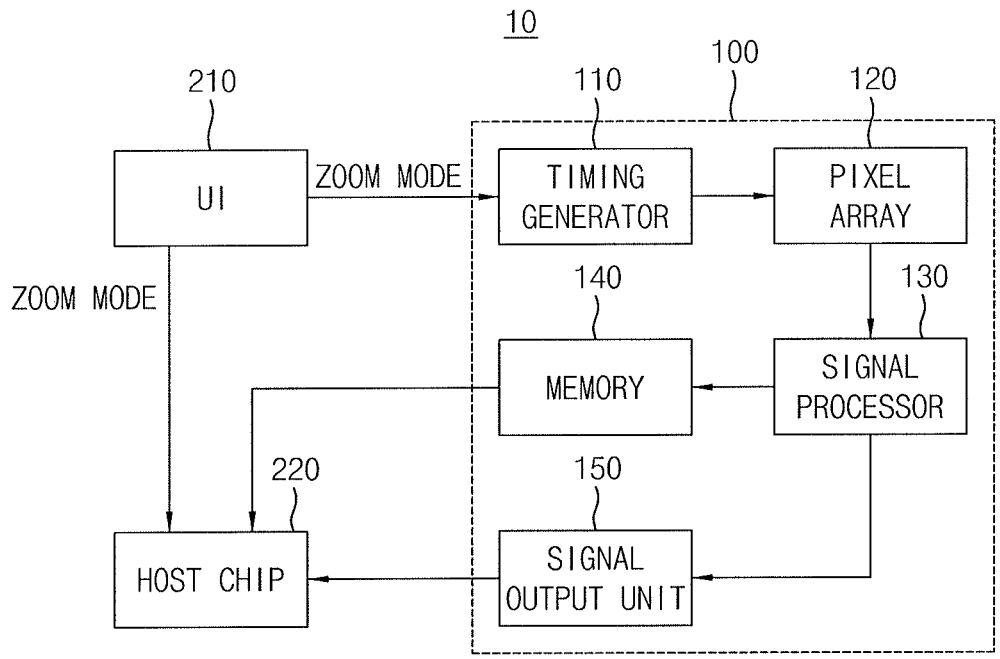
FIG. 1A is a diagram of an electronic device including an image sensor according to an example embodiment.
Figure 1B:
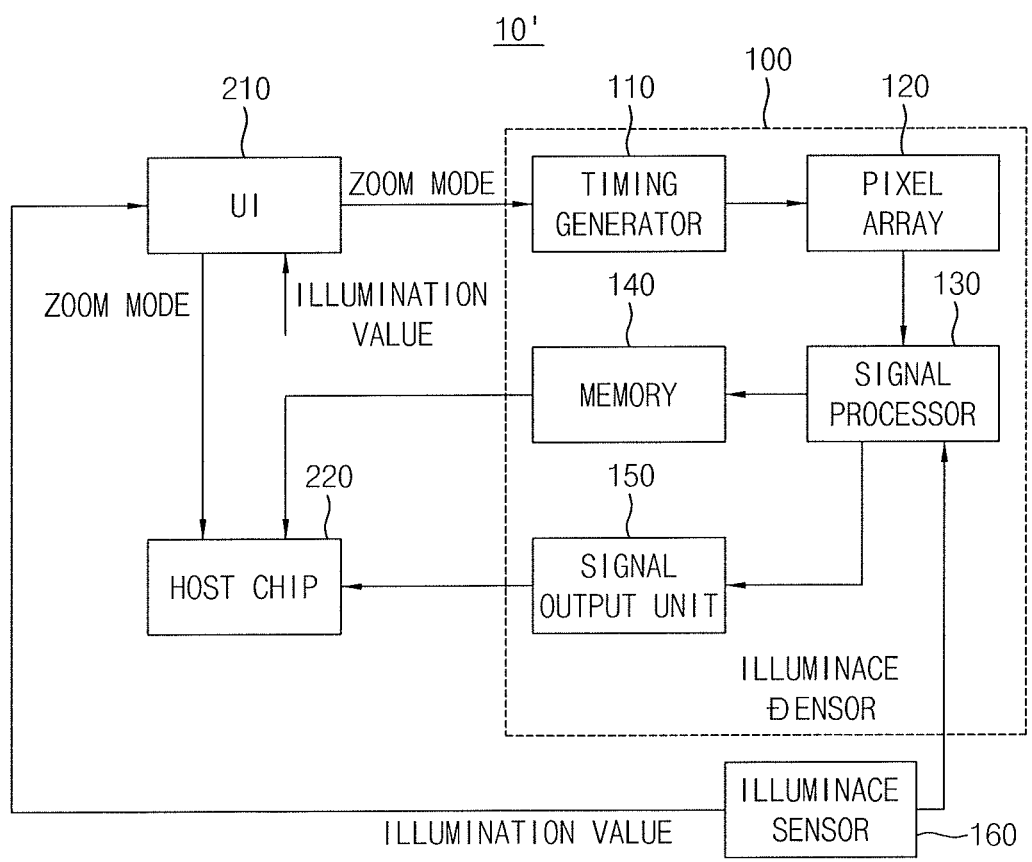
FIG. 1B illustrates a diagram of an electronic device including an image sensor according to an example embodiment.
Figure 2A:
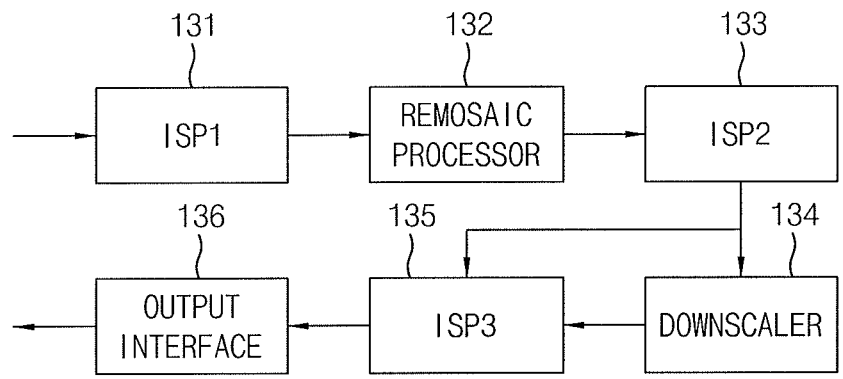
FIG. 2A illustrates a diagram of a signal processor of the image sensor according to an example embodiment.
Figure 3A:
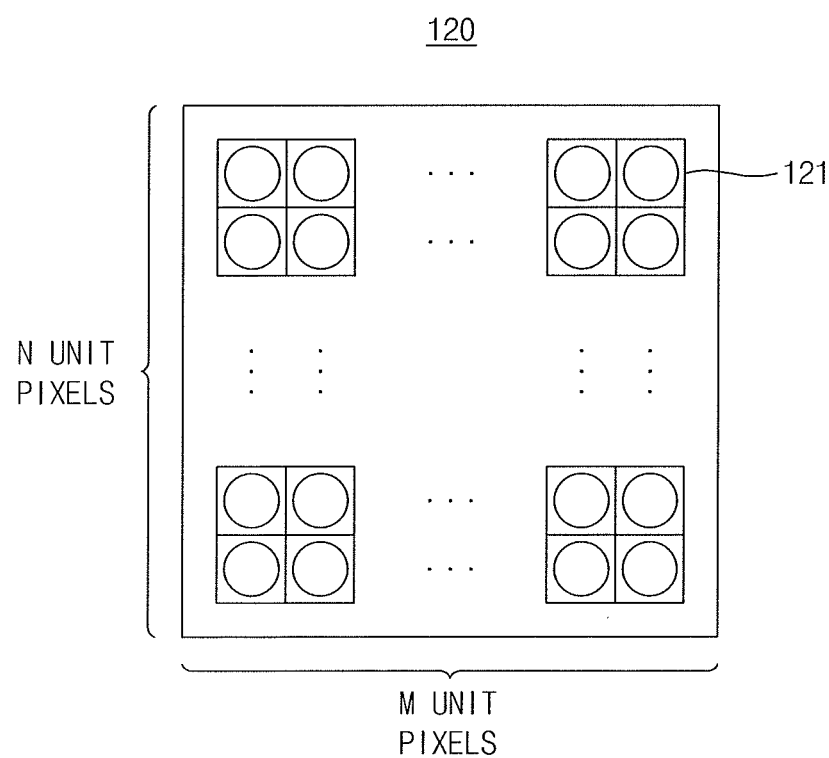
FIG. 3A illustrates a diagram showing a pixel array of the image sensor.
Figure 3B:
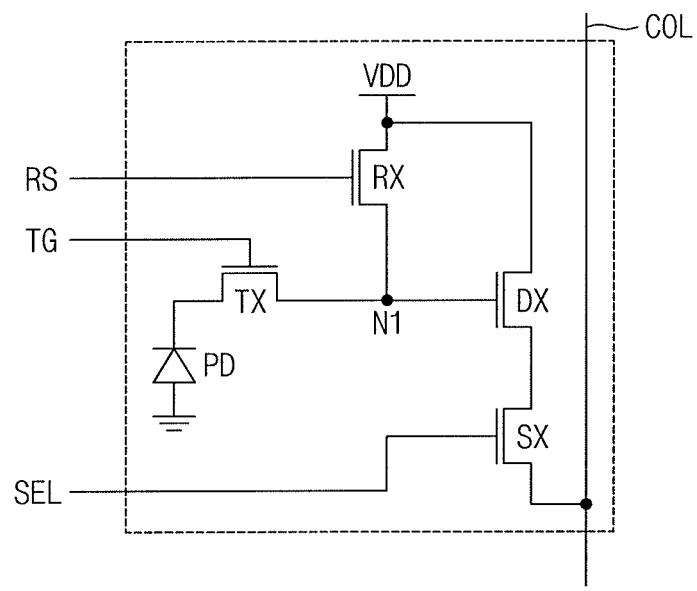
FIG. 3B illustrates a circuit diagram of one unit pixel.

FIG. 1A is a diagram of an electronic device including an image sensor according to an example embodiment. FIG. 1B is a diagram of an electronic device including an image sensor according to an example embodiment. FIG. 2A is a diagram of a signal processor of the image sensor. FIG. 3A is a diagram showing a pixel array of the image sensor. FIG. 3B is a circuit diagram of one unit pixel.

Referring to FIGS. 1A, 2A, 3A and 3B, an electronic device 10 according to an example embodiment may include an image sensor 100, a user interface 210, and a host chip 220. The image sensor 100 may include a timing generator 110, a pixel array 120, a signal processor 130, a memory 140, and a signal output unit 150. The signal processor 130 may include a first image signal processor (ISP) 131, a remosaic processor 132, a second ISP 133, a downscaler 134, a third ISP 135, and an output interface 136.

The electronic device 10 according to an example embodiment may be a device which includes the user interface 210 and the host chip 220, and has display and communication functions. For example, the electronic device 10 may be any one of a smart phone, a tablet personal computer (PC), a mobile phone, a wearable device (e.g., a smart watch), an e-book, a laptop computer, a netbook computer, a personal digital assistant (PDA), a portable multimedia player (PMP), a mobile medical instrument, a digital camera, and the like.

As shown in FIG. 3A, the pixel array 120 may include a plurality of unit pixels 121. The plurality of unit pixels 121 may be arranged in a two-dimensional (2D) array. As an example, the pixel array 120 may be arranged so that N (N is an integer greater than or equal to 1) unit pixels 121 are arranged in a vertical direction and M (M is an integer greater than or equal to 1) unit pixels 121 are arranged in a horizontal direction.

The pixel array 120 may be formed in a chip form and include a plurality of interconnections (see FIG. 3B) for signal input and output of the respective unit pixels 121 and a readout circuit (see FIG. 3B). Each of the plurality of unit pixels 121 may include a color filter (e.g., a red color filter, a blue color filter, a green color filter, and the like). Reflecting characteristics of human sight, 25% of all the unit pixels may include red color filters, 25% may include blue color filters, and 50% may include green color filters. A complementary metal oxide semiconductor (CMOS) image sensor (CIS) may be applied to the pixel array 120. Unit pixels 121 including the same color filter may neighbor each other, thereby constituting the pixel array 120.

As an example, the pixel array 120 may include 16-merged pixel patterns in each of which 16 unit pixels 121 having the same color filter are arranged in a 4×4 matrix. In other words, 16 unit pixels including the same color filter may constitute one 16-merged pixel. Different 16-merged pixels may vertically and horizontally neighbor each other, thereby constituting the pixel array 120.

As an example, the pixel array 120 may include 4-merged pixel patterns in each of which four unit pixels 121 having the same color filter are arranged in a 2×2 matrix. In other words, four unit pixels including the same color filter may constitute one 4-merged pixel. Different 4-merged pixels may vertically and horizontally neighbor each other, thereby constituting the pixel array 120.

The resolution of an image generated by the electronic device 10 may vary depending on the number of unit pixels 121. As an example, the pixel array 120 may include 4,000 unit pixels 121 arranged horizontally, e.g., in a row direction, and 3,000 unit pixels 121 arranged vertically, e.g., along a column direction. In this case, the pixel array 120 may generate an image having a resolution of 12 megapixels (MP) (4,000×3,000). As an example, the pixel array 120 may include 8,000 unit pixels 121 arranged horizontally and 6,000 unit pixels 121 arranged vertically. In this case, the pixel array 120 may generate an image having a resolution of 48 MP (8,000×6,000). As an example, the pixel array 120 may include 12,000 unit pixels 121 arranged horizontally and 9,000 unit pixels 121 arranged vertically. In this case, the pixel array 120 may generate an image having a resolution of 108 MP (12,000×9,000).

As shown in FIG. 3B, each of the plurality of unit pixels 121 may include a photodiode PD, i.e., a photosensitive element and a readout circuit including a plurality of transistors TX, RX, DX, and SX, and a plurality of interconnections. The readout circuit may drive the photodiode PD and read an image signal generated by the photodiode PD. The readout circuit may include the transmission transistor TX, the driving transistor DX, the selection transistor SX, and the reset transistor RX.

Optical charges generated by the photodiode PD may be output to a first node N1 (e.g., a floating diffusion node) through the transmission transistor TX. For example, when a transmission control signal TG is at a first level (e.g., a high level), the transmission transistor TX may be turned on. When the transmission transistor TX is turned on, optical charges generated by the photodiode PD may be output to the first node N1 through the transmission transistor TX.

For example, the driving transistor DX may operate as a source follower buffer amplifier. The driving transistor DX may amplify a signal corresponding to charges stored in the first node N1.

For example, the selection transistor SX may be turned on in response to a selection signal SEL. When the selection transistor SX is turned on, the signal amplified by the driving transistor DX may be transmitted to a column line COL.

For example, the reset transistor RX may be turned on in response to a reset signal RS. When the reset transistor RX is turned on, the charges stored in the first node N1 may be discharged. FIG. 3B shows a unit pixel 121 including one photodiode PD and four MOS transistors TX, RS, DX, and SX. Alternatively, each unit pixel 121 may include one photodiode PD and three or less MOS transistors. Further alternatively, each unit pixel 121 may include one photodiode PD and five or more MOS transistors.

Figure 2B:
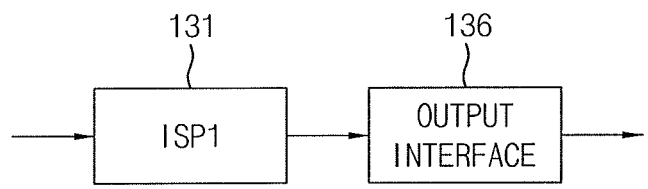
FIG. 2B illustrates a diagram of a signal processor according to an example embodiment.
Figure 2C:
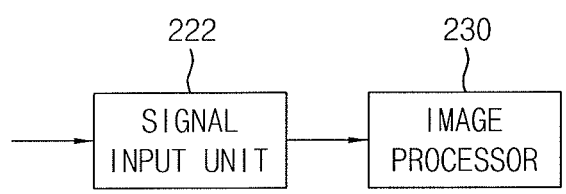
FIG. 2C illustrates a diagram of a host chip according to an example embodiment.
Figure 2D:
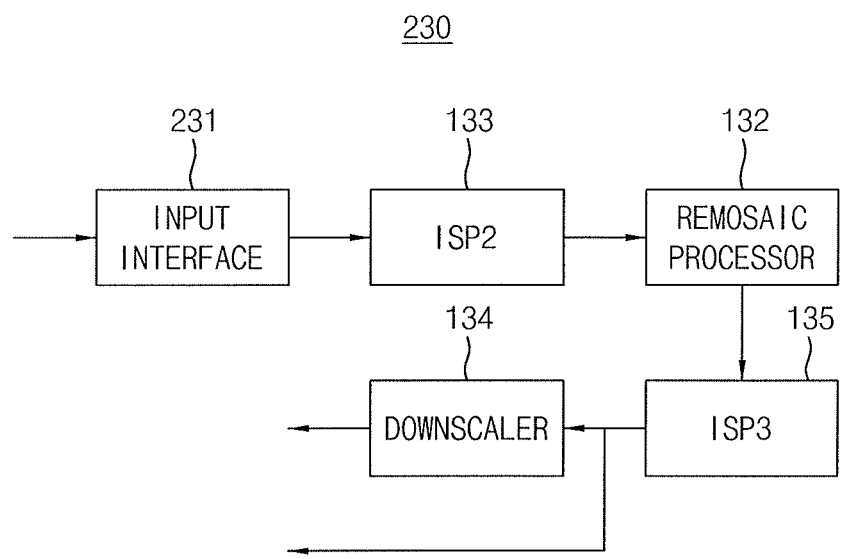
FIG. 2D illustrates a diagram of an image processor of the host chip of FIG. 2C according to an example embodiment.

Referring to FIGS. 2B to 2D, components of the signal processor 130 illustrated in FIG. 2A may be variously configured in other components of the device 10.

As illustrated in FIG. 2B, in contrast to the signal processor 130 in FIG. 2A, a signal processor 130a may include the first ISP 331 and the output interface 136. Then as shown in FIG. 2C, a host chip 220a may provide the additional processing, e.g., may include a signal input unit 222 and an image processor 230.

As illustrated in FIG. 2D, the image processor 230 in the host chip 220a may include an input interface 231, the second ISP 13, the remosaic processor 132, and the downscaler 134. The signal processor 130a may convert a first image output from N×M 16-merged pixels into a data signal and transmit the data signal to the host chip 220a via the signal output unit 150 of FIG. 1. The image processor 230 may receive the data signal via the input interface 231 that converts the input data signal into the first image output from N×M 16-merged pixels. The input interface 231 may transmit the first image to the second ISP 133.

Referring to FIG. 1B, an electronic device 10' according to an example embodiment may include the image sensor 100, the user interface 210, and the host chip 220. The electronic device 10' may additionally include an illuminance sensor 160. The illuminance sensor 160 may output an illumination value to the signal processor 130 and to the user interface 210. The illuminance sensor 160 may be separate from or part of the image sensor 100.

Figure 4:
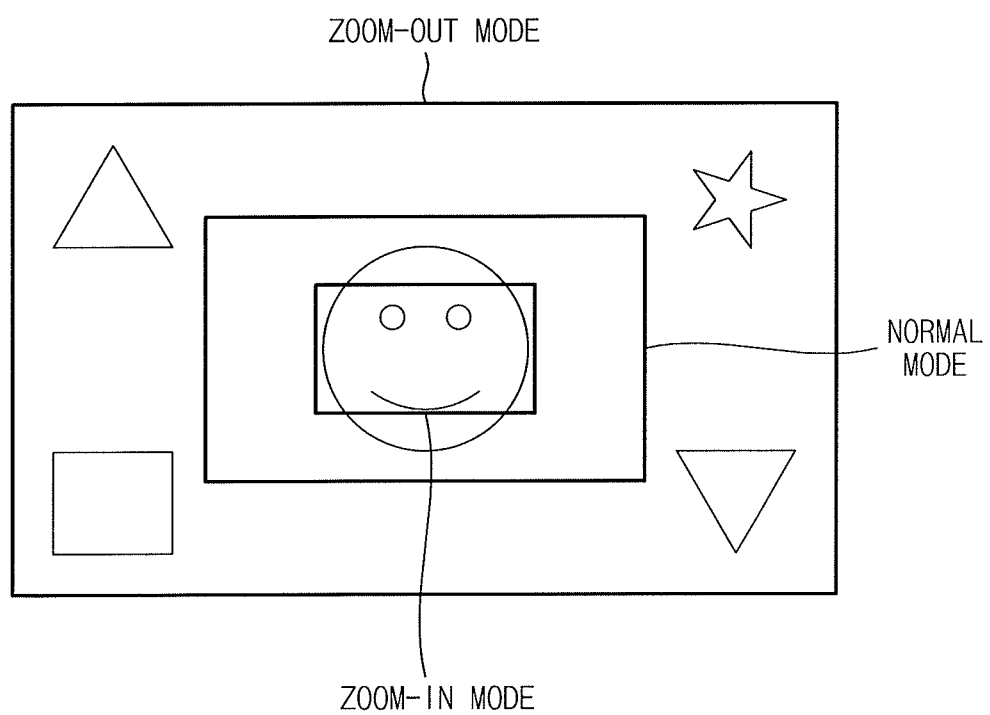
FIG. 4 illustrates a full resolution image acquired by the image sensor.

FIG. 4 shows a full resolution image acquired by the image sensor.

Referring to FIGS. 1A and 4, a user may select a zoom mode through the user interface 210 of the electronic device 10. The user interface 210 may transmit a zoom mode signal according to the zoom mode selection of the user to the image sensor 100. The image sensor 100 may generate an image according to a normal mode, a zoom-in mode, or a zoom-out mode on the basis of the input zoom mode.

Referring to FIGS. 1B and 4, the illuminance sensor 160 is a sensor for measuring the amount of light and may sense ambient illuminance of the image sensor 100 when a resistance value changes according to the amount of light incident thereon. The illuminance sensor 160 may generate an illuminance value according to the sensed illuminance and transmit the generated illuminance value to the user interface 210 and the signal processor 130.

The user interface 210 may automatically select the normal mode, the zoom-in mode, or the zoom-out mode using the illuminance value rather than the normal mode, the zoom-in mode, or the zoom-out mode the user interface 210 is selected using the user interface 210. As an example, the user interface 210 may generate a normal mode signal, a zoom-in mode signal, or a zoom-out mode signal on the basis of the illuminance value input from the illuminance sensor 160. The user interface 210 may transmit the generated normal mode signal, zoom-in mode signal, or zoom-out mode signal to the image sensor 100. The signal processor 130 may generate a normal mode image, a zoom-in mode image, or a zoom-out mode image on the basis of the input normal mode signal, zoom-in mode signal, or zoom-out mode signal.

As shown in FIG. 1A, a zoom mode signal according to a selection of the user may be transmitted to the image sensor 100 through the user interface 210. As shown in FIG. 1B, a zoom mode signal based on an illuminance value of the illuminance sensor 160 may be transmitted to the image sensor 100. Both mechanisms may be employed, e.g., in the electronic device 10', the user interface 210 may override the mode signal automatically set by the illuminance sensor 160.

Generation of Normal Mode Image

Figure 5A:
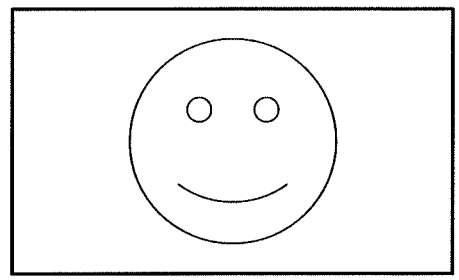
FIG. 5A illustrates a normal mode image generated by cropping a part of the full resolution image on the basis of the center.
Figure 5B:
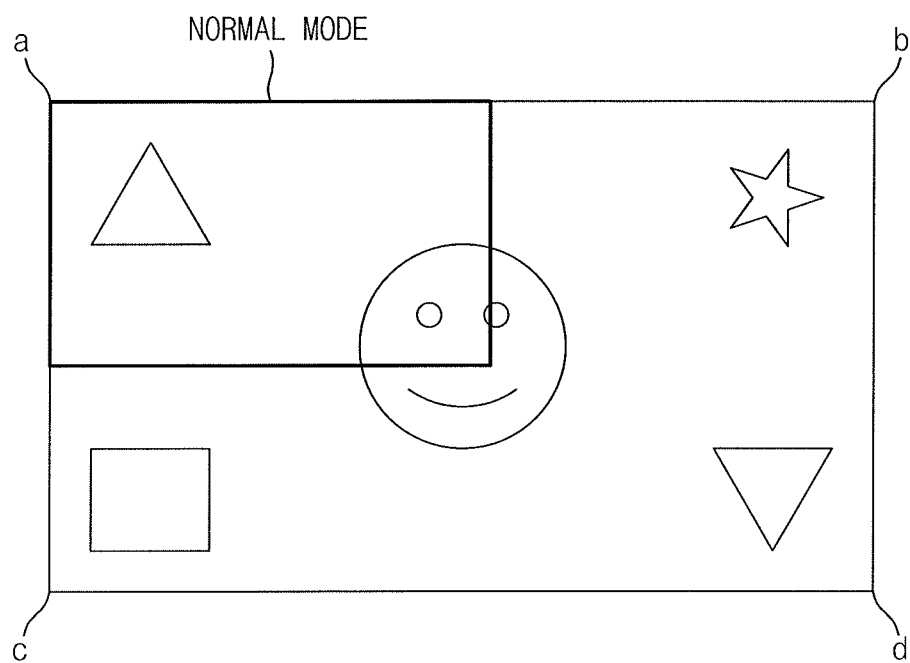
FIG. 5B illustrates an operation of generating a normal mode image by cropping a part of the full resolution image on the basis of a corner.

FIG. 5A shows a normal mode image generated by cropping a part of the full resolution image on the basis of the center. FIG. 5B shows an operation of generating a normal mode image by cropping a part of the full resolution image on the basis of a corner.

Referring to FIGS. 1A to 5B, the timing generator 110 may generate a driving signal (e.g., a horizontal reference signal, a vertical reference signal, a horizontal scanning reference signal, a vertical scanning reference signal, and a field signal) for driving the pixel array 120. The timing generator 110 may supply the generated driving signal to each unit pixel 121 of the pixel array 120. A normal mode signal may be input from the user interface 210 to the image sensor 100. The timing generator 110 may drive all the unit pixels of the pixel array 120 on the basis of the input normal mode signal.

As shown in FIG. 4, the image sensor 100 may crop a part of the full resolution image which is generated by driving all the unit pixels of the pixel array 120. The image sensor 100 may output the full resolution image generated by driving all the unit pixels of the pixel array 120 as it is. The image sensor 100 may generate a normal mode image by cropping an entirety or a part of the full resolution image.

As an example, the timing generator 110 may generate a normal mode image in which first unit pixels, which correspond to the normal mode among all the unit pixels of the pixel array 120, output signals. The timing generator 110 may stop second unit pixels, which are all the unit pixels of the pixel array 120 other than the first unit pixels corresponding to the normal mode, from outputting signals. In other words, before a zoom mode signal for an image is input, the image sensor 100 may drive all the unit pixels, and the electronic device 10 may display the full resolution image on a screen. When the normal mode signal is input, the image sensor 100 may generate a normal mode image in which the first unit pixels output signals. The image sensor 100 may stop signal output of the second unit pixels other than the first unit pixels corresponding to the normal mode signal.

As an example, the timing generator 110 may drive all the unit pixels of the pixel array 120 on the basis of the input normal mode signal. When all the unit pixels of the pixel array 120 output signals, a full resolution image may be generated. Subsequently, the full resolution image generated by the pixel array 120 may be transmitted to the signal processor 130. The signal processor 130 may generate a normal mode image by cropping a part of the full resolution image.

Since the image sensor 100 generates a normal mode image by cropping a part of a full resolution image, the volume (i.e., data size) of the normal mode image may be reduced compared to the full resolution image. The image sensor 100 may generate a normal mode image by cropping an area corresponding to $\frac{1}{2}$ to $\frac{1}{16}$ of the full resolution image on the basis of a specific point. In other words, a normal mode image may be generated on the basis of image signals output from $\frac{1}{2}$ to $\frac{1}{16}$ of all the unit pixels. A normal mode image may be generated on the basis of image signals output from $\frac{1}{2}$ to $\frac{1}{16}$ of all the merged pixels.

For example, as shown in FIG. 5A, the image sensor 100 may generate a normal mode image by cropping an area corresponding to $\frac{1}{2}$ to $\frac{1}{16}$ of the full resolution image on the basis of the center of the full resolution image. In other words, the image sensor 100 may generate a normal mode image by causing $\frac{1}{2}$ to $\frac{1}{16}$ of all the unit pixels based on the center of the pixel array 120 to output signals.

For example, as shown in FIG. 5B, the image sensor 100 may generate a normal mode image by cropping an area corresponding to $\frac{1}{2}$ to $\frac{1}{16}$ of the full resolution image on the basis of an upper left corner a of the full resolution image. In other words, the image sensor 100 may generate a normal mode image by causing $\frac{1}{2}$ to $\frac{1}{16}$ of all the unit pixels based on the upper left corner a of the pixel array 120 to output signals.

In addition to this, the image sensor 100 may generate a normal mode image by cropping an area corresponding to $\frac{1}{2}$ to $\frac{1}{16}$ of the full resolution image on the basis of an upper right corner b of the full resolution image. In addition to this, the image sensor 100 may generate a normal mode image by cropping an area corresponding to $\frac{1}{2}$ to $\frac{1}{16}$ of the full resolution image on the basis of a lower left corner c of the full resolution image. In addition to this, the image sensor 100 may generate a normal mode image by cropping an area corresponding to $\frac{1}{2}$ to $\frac{1}{16}$ of the full resolution image on the basis of a lower right corner d of the full resolution image.

For example, the image sensor 100 may generate a normal mode image by cropping an area corresponding to $\frac{1}{2}$ to $\frac{1}{16}$ of the full resolution image on the basis of a specific point other than the center of the full resolution image (i.e., the center of the pixel array 120) and the four corners a, b, c, and d.

Generation of Zoom-In Mode Image

Figure 6A:
FIG. 6A illustrates a zoom-in mode image generated by cropping a part of the full resolution image on the basis of the center.
Figure 6B:
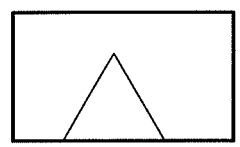
FIG. 6B illustrates an operation of generating a zoom-in mode image by cropping a part of the full resolution image on the basis of a corner.

FIG. 6A shows a zoom-in mode image generated by cropping a part of the full resolution image based on the center. FIG. 6B shows an operation of generating a zoom-in mode image by cropping a part of the full resolution image on the basis of a corner.

Referring to FIGS. 1A to 4 and FIGS. 6A and 6B, a zoom-in mode signal may be input from the user interface 210 to the image sensor 100. The timing generator 110 may drive all the unit pixels of the pixel array 120 on the basis of the input zoom-in mode signal. As shown in FIG. 4, the image sensor 100 may crop a part of the full resolution image generated by driving all the unit pixels of the pixel array 120. The image sensor 100 may generate a zoom-in mode image by cropping a part of the full resolution image. The image sensor 100 may generate a zoom-in mode image by cropping a smaller area than a normal mode image (e.g., a $\frac{1}{2}$ to $\frac{1}{4}$ area of the normal mode image) in the full resolution image.

As an example, the timing generator 110 may generate a zoom-in mode image by causing first unit pixels, which correspond to a zoom-in mode among all the unit pixels of the pixel array 120, to output signals. The timing generator 110 may stop signal output of second unit pixels, which are all the unit pixels of the pixel array 120 other than the first unit pixels corresponding to the zoom-in mode. In other words, before a zoom mode signal for an image is input, the image sensor 100 may drive all the unit pixels, and the electronic device 10 may display the full resolution image on the screen. When the zoom-in mode signal is input, the image sensor 100 may generate a zoom-in mode image by causing the first unit pixels to output signals. The image sensor 100 may stop signal output of the second unit pixels other than the first unit pixels corresponding to the zoom-in mode signal.

As an example, the timing generator 110 may drive all the unit pixels of the pixel array 120 on the basis of the input zoom-in mode signal. All the unit pixels of the pixel array 120 output signals such that the full resolution image may be generated. Subsequently, the full resolution image generated by the pixel array 120 may be transmitted to the signal processor 130. The signal processor 130 may generate a zoom-in mode image by cropping a part of the full resolution image.

Since the image sensor 100 generates a zoom-in mode image by cropping a part of a full resolution image, the volume (i.e., data size) of the zoom-in mode image may be reduced compared to the full resolution image. The image sensor 100 may generate a zoom-in mode image by cropping an area corresponding to $\frac{1}{4}$ to $\frac{1}{64}$ of the full resolution image on the basis of a specific point. In other words, a zoom-in mode image may be generated on the basis of image signals output from $\frac{1}{4}$ to $\frac{1}{64}$ of all the unit pixels.

For example, as shown in FIG. 6A, the image sensor 100 may generate a zoom-in mode image by cropping an area corresponding to $\frac{1}{4}$ to $\frac{1}{64}$ of the full resolution image on the basis of the center of the full resolution image. In other words, the image sensor 100 may generate a zoom-in mode image by causing $\frac{1}{4}$ to $\frac{1}{64}$ of all the unit pixels based on the center of the pixel array 120 to output signals.

For example, as shown in FIG. 6B, the image sensor 100 may generate a zoom-in mode image by cropping an area corresponding to $\frac{1}{4}$ to $\frac{1}{64}$ of the full resolution image on the basis of the upper left corner a of the full resolution image.

In other words, the image sensor 100 may generate a zoom-in mode image by causing ¼ to ¹⁄₆₄ of all the unit pixels based on the upper left corner a of the pixel array 120 to output signals.

In addition to this, the image sensor 100 may generate a zoom-in mode image by cropping an area corresponding to ¼ to ¹⁄₆₄ of the full resolution image on the basis of the upper right corner b of the full resolution image. In addition to this, the image sensor 100 may generate a zoom-in mode image by cropping an area corresponding to ¼ to ¹⁄₆₄ of the full resolution image on the basis of the lower left corner c of the full resolution image. In addition to this, the image sensor 100 may generate a zoom-in mode image by cropping an area corresponding to ¼ to ¹⁄₆₄ of the full resolution image on the basis of the lower right corner d of the full resolution image.

For example, the image sensor 100 may generate a zoom-in mode image by cropping an area corresponding to ¼ to ¹⁄₆₄ of the full resolution image on the basis of a specific point other than the center of the full resolution image (i.e., the center of the pixel array 120) and the four corners a, b, c, and d.

Generation of Zoom-Out Mode Image

Figure 7:
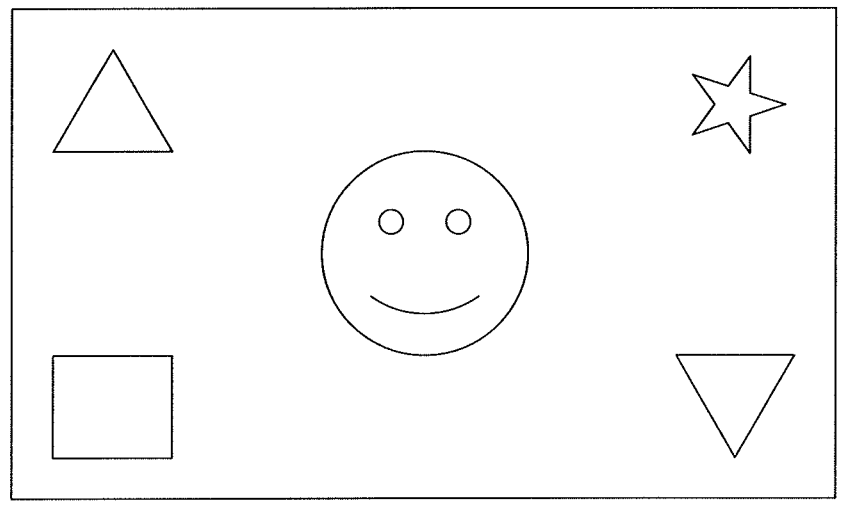
FIG. 7 illustrates a zoom-out mode image.

FIG. 7 shows a zoom-out mode image.

Referring to FIGS. 1A to 4 and FIG. 7, a zoom-out mode signal may be input from the user interface 210 to the image sensor 100. The timing generator 110 may drive all the unit pixels of the pixel array 120 on the basis of the input zoom-out mode signal. As shown in FIG. 4, the image sensor 100 may generate a zoom-out mode image on the basis of the full resolution image generated by driving all the unit pixels of the pixel array 120.

As an example, the timing generator 110 may drive all the unit pixels of the pixel array 120 on the basis of the input zoom-out mode signal. The timing generator 110 may generate a zoom-out mode image by causing all the unit pixels of the pixel array 120 to output signals.

When all the unit pixels of the pixel array 120 output signals, a full resolution image may be generated. Subsequently, the full resolution image generated by the pixel array 120 may be transmitted to the signal processor 130. The signal processor 130 may generate a zoom-out mode image through signal processing of the full resolution image. When the full resolution image is applied to a zoom-out mode image as it is, the volume of data may increase. The signal processor 130 may reduce the data size of a zoom-out mode image through signal processing. The signal processor 130 may transmit the zoom-out mode image whose volume has been reduced to the host chip 220 through the signal output unit 150.

Alternatively, the full resolution image data may be output from the signal processor 130a to the host chip 220a after being processed by the first ISP 131.

FIG. 4 shows that the image sensor 100 generates a zoom-out mode image at the same zoom level as the full resolution image. In addition to this, the image sensor 100 may generate a zoom-out mode image at a zoom level of ½ to 1 times the full resolution image.

When the image sensor 100 generates a zoom-out mode image at a zoom level of ½ to 1 times the full resolution image, the timing generator 110 may drive all the unit pixels of the pixel array 120 on the basis of the input zoom-out mode signal. The image sensor 100 may crop a part of the full resolution image generated by driving all the unit pixels of the pixel array 120. The image sensor 100 may generate a zoom-out mode image by using the whole or by cropping a part of the full resolution image.

As an example, the timing generator 110 may generate a zoom-out mode image by causing first unit pixels, which correspond to a zoom-out mode among all the unit pixels of the pixel array 120, to output signals. The timing generator 110 may stop signal output of second unit pixels, which are all the unit pixels of the pixel array 120 other than the first unit pixels corresponding to the zoom-out mode.

As an example, the timing generator 110 may drive all the unit pixels of the pixel array 120 on the basis of the input zoom-out mode signal. All the unit pixels of the pixel array 120 are caused to output signals such that the full resolution image may be generated. Subsequently, the full resolution image generated by the pixel array 120 may be transmitted to the signal processor 130. The signal processor 130 may generate a zoom-out mode image by cropping an area corresponding to ½ to 1 of the full resolution image. The image sensor 100 may generate a zoom-out mode image by cropping an area corresponding to ½ to 1 of the full resolution image on the basis of a specific point. In other words, a zoom-out mode image may be generated on the basis of image signals output from all the unit pixels at a maximum. A zoom-out mode image may be generated on the basis of image signals output from half of all the unit pixels at a minimum.

The image sensor 100 may generate a zoom-out mode image on the basis of the center of the pixel array 120. In addition to this, the image sensor 100 may generate a zoom-out mode image on the basis of the upper left corner, upper right corner, lower left corner, or lower right corner of the pixel array 120. In addition to this, the image sensor 100 may generate a zoom-out mode image on the basis of a specific point other than the center of the pixel array 120 and the four corners a, b, c, and d.

Figure 8A:
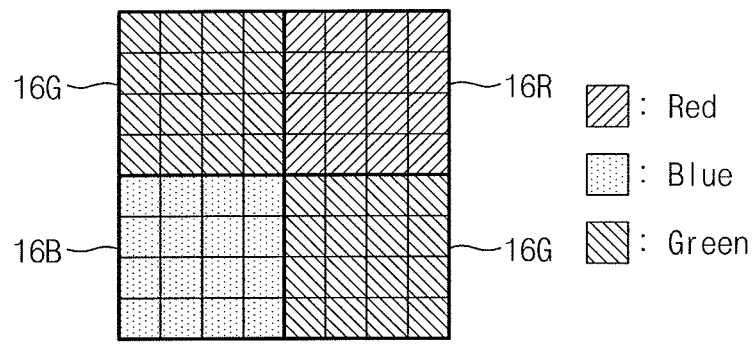
FIG. 8A illustrates an example of 16-merged pixel patterns.

FIG. 8A shows an example of 16-merged pixel patterns.

Referring to FIGS. 3A and 8A, each of the plurality of unit pixels 121 in the pixel array 120 may include a red color filter, a blue color filter, or a green color filter. 16 unit pixels including the same color filter may be arranged in an N×M matrix (e.g., a 4×4 matrix) to constitute one N×M merged pixel (e.g., a 16-merged pixel). In the pixel array 120, first 16-merged pixels 16R including red color filters, second 16-merged pixels 16B including blue color filters, and third 16-merged pixels 16G including green color filters at a ratio of 1:1:2. Second 16-merged pixels 16B including blue color filters may be diagonal to first 16-merged pixels 16R including red color filters. Third 16-merged pixels 16G including green color filters may be on the upper, lower, left, and right sides of first 16-merged pixels 16R including red color filters. First 16-merged pixels including 16R red color filters may be diagonal to second 16-merged pixels 16B including blue color filters. Third 16-merged pixels 16G including green color filters may be on the upper, lower, left, and right sides of second 16-merged pixels 16B including blue color filters. First 16-merged pixels 16R including red color filters may be on the upper and lower sides of third 16-merged pixels 16G including green color filters. Second 16-merged pixels 16B including blue color filters may be son the left and right sides of third 16-merged pixels 16G including green color filters.

Figure 8B:
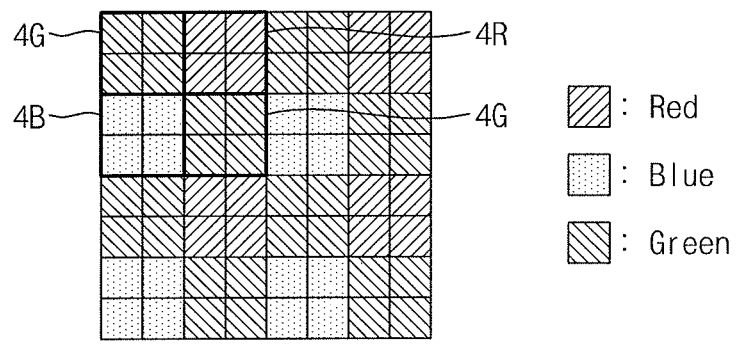
FIG. 8B illustrates an example of 4-merged pixel patterns.

FIG. 8B shows an example of 4-merged pixel patterns.

Referring to FIGS. 3A and 8B, each of the plurality of unit pixels 121 in the pixel array 120 may include a red color filter, a blue color filter, or a green color filter. Pixels including the same color filter may be arranged in an N×M matrix (e.g., a 2×2 matrix of four unit pixels) to constitute one N×M merged pixel (e.g., a 4-merged pixel). In the pixel array 120, first 4-merged pixels 4R including red color filters, second 4-merged pixels 4B including blue color filters, and third 4-merged pixels 4G including green color filters at a ratio of 1:1:2. The second 4-merged pixels 4B including blue color filters may be diagonal to the first 4-merged pixels 4R including red color filters. The third 4-merged pixels 4G including green color filters may be on the upper, lower, left, and right sides of the first 4-merged pixels 4R including red color filters. The first 4-merged pixels 4R including red color filters may be diagonal to the second 4-merged pixels 4B including blue color filters. The third 4-merged pixels 4G including green color filters may be on the upper, lower, left, and right sides of the second 4-merged pixels 4B including blue color filters. The first 4-merged pixels 4R including red color filters may be on the upper and lower sides of the third 4-merged pixels 4G including green color filters. The second 4-merged pixels 4B including blue color filters may be on the left and right sides of the third 4-merged pixels 4G including green color filters.

Figure 8C:
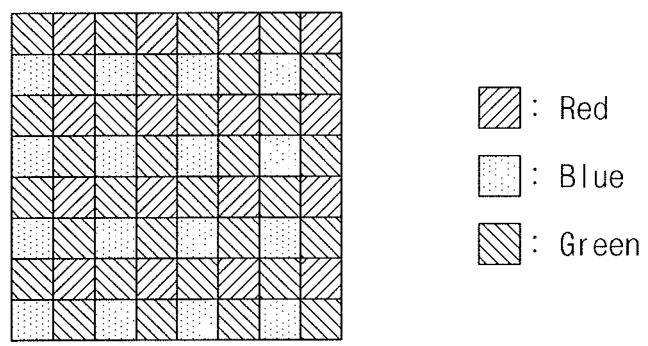
FIG. 8C illustrates an example of Bayer pixel patterns.

FIG. 8C shows an example of Bayer pixel patterns.

Referring to FIGS. 3A and 8C, each of the plurality of unit pixels 121 in the pixel array 120 may include a red color filter, a blue color filter, or a green color filter. First unit pixels including red color filters, second unit pixels including blue color filters, and third unit pixels including green color filters may be at a ratio of 1:1:2. Second unit pixels including blue color filters may be diagonal to first unit pixels including red color filters. Third unit pixels including green color filters may be on the upper, lower, left, and right sides of first unit pixels including red color filters. First unit pixels including red color filters may be diagonal to second unit pixels including blue color filters. Third unit pixels including green color filters may be on the upper, lower, left, and right sides of second unit pixels including blue color filters. First unit pixels including red color filters may be on the left and right sides of third unit pixels including green color filters. Second unit pixels including blue color filters may be on the upper and lower sides of third unit pixels including green color filters.

The image sensor 100 may transmit an image to the host chip 220, 220a or the electronic device 10 may transmit an image to another electronic device. When the resolution of the image to be transmitted increases, the volume of data increases, and frames per second (FPS) is reduced. Assuming that a 1,024×1,024 image is transmitted, data of 3 megabytes (MB) per image is transmitted. When 1,024×1,024 image data based on the Bayer pixel patterns shown in FIG. 8C is transmitted, data of 1 MB per image is transmitted. In other words, the FPS when image data based on the Bayer pixel patterns is transmitted maybe three times greater than when the Bayer pixel pattern is not used.

Figure 8D:
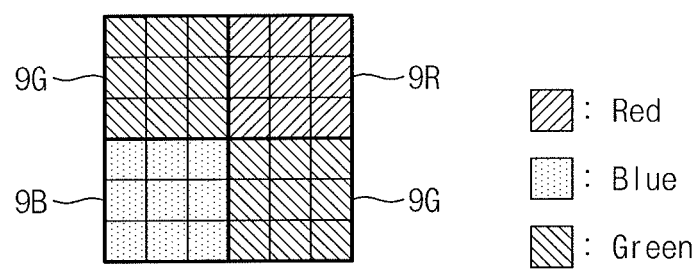
FIG. 8D shows an example of 9-merged pixel patterns.

FIG. 8D shows an example of 9-merged pixel patterns.

Referring to FIGS. 3A and 8D, each of the plurality of unit pixels 121 in the pixel array 120 may include a red color filter, a blue color filter, or a green color filter. Pixels including the same color filter may be arranged in an N×M matrix (e.g., a 3×3 matrix of nine unit pixels) to constitute one N×M merged pixel (e.g., a 9-merged pixel). In the pixel array 120, first 9-merged pixels 9R including red color filters, second 9-merged pixels 9B including blue color filters, and third 9-merged pixels 9G including green color filters may be disposed at a ratio of 1:1:2.

Figure 8E:
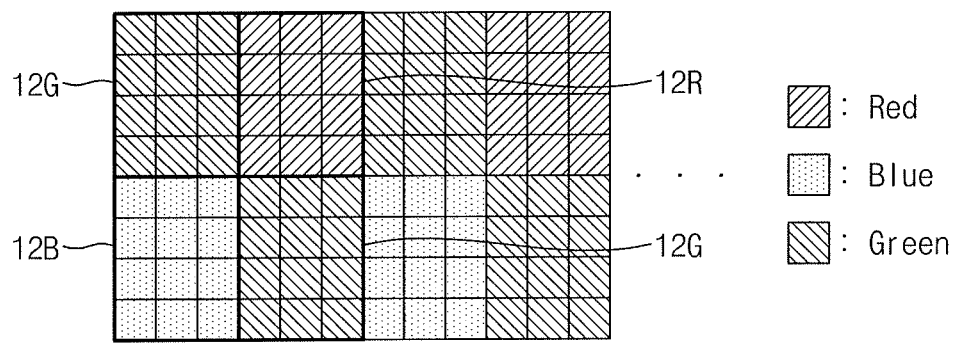
FIG. 8E shows an example of N×M merged pixel patterns.

FIG. 8E shows an example of N×M-merged pixel patterns.

Referring to FIGS. 3A and 8E, each of the plurality of unit pixels 121 in the pixel array 120 may include a red color filter, a blue color filter, or a green color filter. Pixels including the same color filter may be arranged in an N×M matrix (e.g., a 3×4 matrix of 12 unit pixels) to constitute one N×M merged pixel (e.g., a 12-merged pixel). FIGS. 8A, 8B, and 8D show merged pixels in which unit pixels are arranged in 4×4, 2×2, and 3×3 matrices. However, pixels are not limited thereto, and the number of pixels arranged in a horizontal direction may differ from the number of pixels arranged in a vertical direction as shown in FIG. 8E. In the pixel array 120, first 12-merged pixels 12R including red color filters, second 12-merged pixels 12B including blue color filters, and third 12-merged pixels 12G including green color filters may be disposed at a ratio of 1:1:2.

Figure 9A:
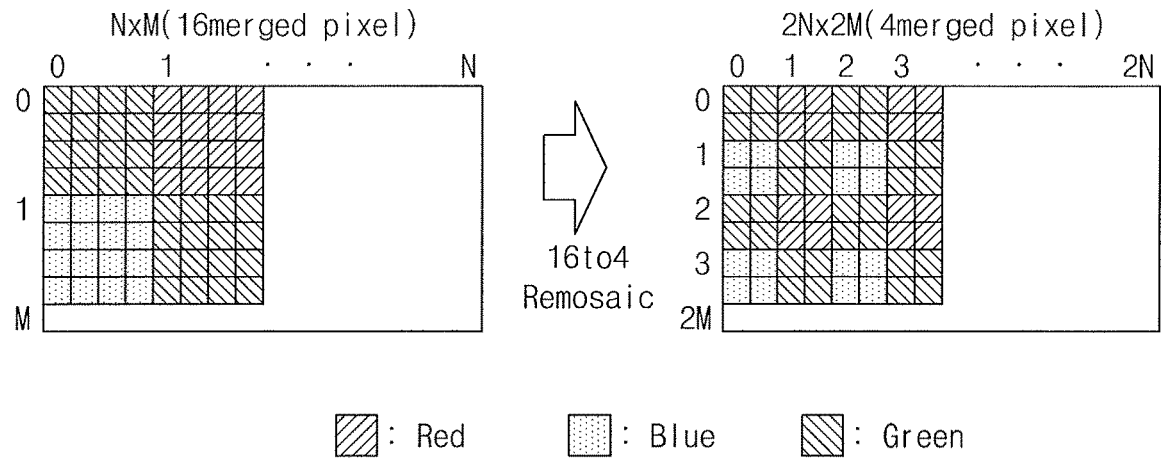
FIG. 9A illustrates an example of remosaicing 16-merged pixel patterns with 4 merged pixel patterns.

FIG. 9A shows an example of remosaicing 16-merged pixel patterns with 4 merged pixel patterns.

Referring to FIGS. 1A to 2D, and 9A, the signal processor 130 may include the first ISP 131, the remosaic processor 132, the second ISP 133, the downscaler 134, the third ISP 135, and the output interface 136, or the signal processor 130a may include the first ISP 131 and the output interface 136, while the image processor 230 in the host chip 220a may include the remosaic processor 132, the second ISP 133, the downscaler 134, and the third ISP 135.

The signal processor 130 or 130a may receive a first image output from N×M 16-merged pixels. The first ISP 131 may perform auto dark level compensation (ADLC) on the input first image. The first ISP 131 may perform bad pixel correction on the input first image. The first ISP 131 may perform lens shading correction on the input first image. The first ISP 131 may transmit the first image which has gone through ADLC, bad pixel correction, and lens shading correction to the remosaic processor 132 or to the host chip 220a, which supplies the first image having gone through the second ISP 133 to the remosaic processor 132 in the image processor 230.

The remosaic processor 132 may convert the first image based on the N×M 16-merged pixels into a second image output from 2N×2M 4-merged pixels (e.g., a 4-merged pixel image) by remosaicing the first image. In other words, the remosaic processor 132 may remosaic a first image output from 16-merged pixels so that the first image may be converted into a second image output from 4-merged pixels (e.g., a 4-merged merged pixel image). Although the pixel array 120 is physically composed of 16-merged pixel patterns, the remosaic processor 132 may convert an image of the 16-merged pixel patterns into an image of 4-merged pixel patterns through remosaic processing.

As an example, the remosaic processor 132 may convert a first image output from N×M 16-merged pixels into a second image output from 2N×2M 4-merged pixels (e.g., a 4-merged pixel image) by remosaicing the first image once. The remosaic processor 132 may transmit the second image (e.g. a 4-merged pixel image), which is an image converted through remosaic processing into an output from 2N×2M 4-merged pixels, to the second ISP 133. Since the remosaic processor 132 converts the first image of 16-merged pixels into the second image of 4-merged pixels by remosaicing the first image once, the image may be zoomed-in on twice without degrading resolution.

As an example, the remosaic processor 132 may convert a first image output from N×M 16-merged pixels into a third image output from 4N×4M Bayer pixels (e.g., a single-pixel image) by remosaicing the first image twice. The remosaic processor 132 may transmit the third image (e.g. a single-pixel image), which is an image converted through remosaic processing into an output from 4N×4M Bayer pixels, to the second ISP 133. Since the remosaic processor 132 converts the first image of 16-merged pixels into the third image of single pixels by remosaicing the first image twice, the image may be zoomed-in on four times without degrading resolution.

Figure 9B:
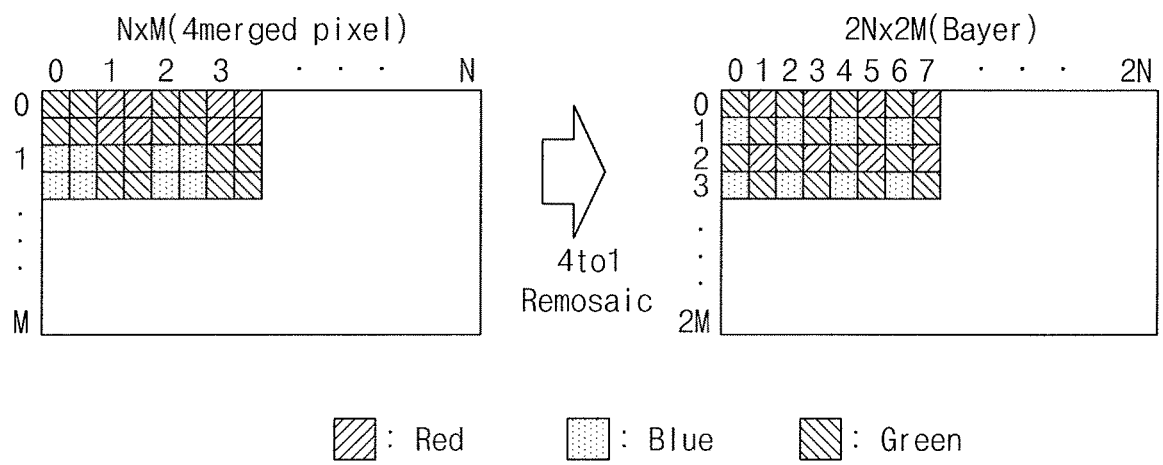
FIG. 9B illustrates an example of remosaicing 4-merged pixel patterns with Bayer pixel patterns.

FIG. 9B shows an example of remosaicing 4-merged pixel patterns with Bayer pixel patterns.

Referring to FIGS. 1A, 1B, 2A, 2D, and 9B, the remosaic processor 132 may convert a first image based on N×M 4-merged pixels into a second image output from 2N×2M Bayer pixels (e.g., a single-pixel image) by remosaicing the first image. In other words, the remosaic processor 132 may remosaic a first image output from 4-merged pixels so that the first image may be converted into a second image output from single pixels (e.g. a single-pixel image). Although the pixel array 120 is physically composed of 4-merged pixel patterns, the remosaic processor 132 may convert an image of the 4-merged pixel patterns into an image of Bayer pixel patterns through remosaic processing.

The remosaic processor 132 may transmit the second image (e.g. a single-pixel image), which is an image converted through remosaic processing into an output from 2N×2M Bayer pixels, to the second ISP 133. Alternatively, the second ISP 133 may receive the first image which has gone through ADLC, bad pixel correction, and lens shading correction from the first ISP 131, further correct the first image, and provide the first image to the remosaic processor 132, which then transmits the second image to the third ISP 135. Since the remosaic processor 132 converts the first image (e.g., a 4-merged pixel image) into the second image of Bayer pixels by remosaicing the first image once, the image may be zoomed-in on twice without degrading resolution.

Figure 9C:
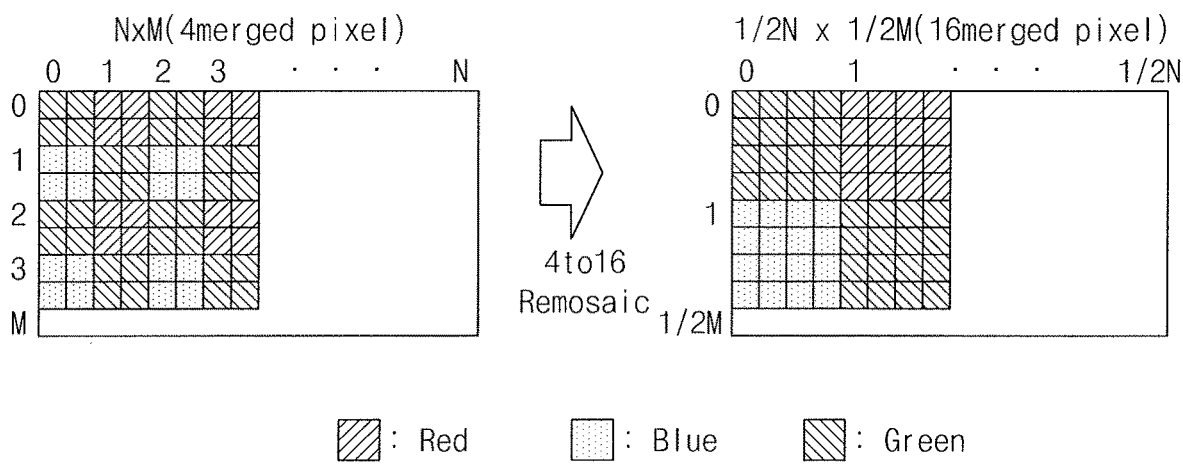
FIG. 9C illustrates an example of remosaicing 4-merged pixel patterns with 16-merged pixel patterns.

FIG. 9C shows an example of remosaicing 4-merged pixel patterns with 16-merged pixel patterns.

Referring to FIGS. 1A, 1B, 2A, 2D, and 9C, the remosaic processor 132 may convert a first image based on N×M 4-merged pixels into a second image output from ½N×½M 16-merged pixels (e.g., a 16-merged pixel image) by remosaicing the first image. In other words, the remosaic processor 132 may remosaic a first image output from 4-merged pixels, e.g., merged pixels each including a k*l matrix of a same color, so that the first image may be converted into a second image output from 16-merged pixels (e.g., a 16-merged pixel image), e.g., merged pixels each including a $k^2*l^2$ matrix of a same color. Although the pixel array 120 is physically composed of 4-merged pixel patterns, the remosaic processor 132 may convert an image of the 4-merged pixel patterns into an image of 16-merged pixel patterns through remosaic processing.

The remosaic processor 132 may transmit the second image (e.g., a 16-merged pixel image), which is an image converted through remosaic processing into an output from ½N×½M 16-merged pixels, to the second ISP 133. Alternatively, the second ISP 133 may receive the first image which has gone through ADLC, bad pixel correction, and lens shading correction from the first ISP 131, further correct the first image, and provide the first image to the remosaic processor 132, which then transmits the second image to the third ISP 135. Since the remosaic processor 132 converts the first image (e.g., a 4-merged pixel image) into the second image of 16-merged pixels by remosaicing the first image once, the image may be zoomed-out ½ times without degrading resolution.

Referring back to FIGS. 1A, 1B, 2A, and 2D, the second ISP 133 or the third ISP 135 may perform bad pixel correction, lens shading correction, and noise canceling on an input second image (e.g., a 4-merged pixel image). The second ISP 133 or the third ISP 135 may perform bad pixel correction, lens shading correction, and noise canceling on an input third image (e.g., a single-pixel image). The second ISP 133 or the third ISP 135 may perform at least one of bad pixel correction, lens shading correction, and noise canceling. The second ISP 133 or the third ISP 135 may transmit the second image or the third image, which has gone through at least one of bad pixel correction, lens shading correction, and noise canceling to the third ISP 135, or to a display device and/or communication module, either directly or through the downscaler 134.

When a normal mode image is output to the host chip 220 or a zoom-in mode image obtained through remosaic processing is output to the host chip 220, the image output from the second ISP 133 may be input to the third ISP 135 not through the downscaler 134 or the image output from the third ISP 135 may be output directly to a display device and/or communication module, e.g., not through the downscaler 134. An image may be input to the downscaler 134 so as to be zoomed-out, and the image may be zoomed-out by an operation of the downscaler 134. The downscaler 134 may reduce the volume of data of the input image by decimating the image. Decimation of the downscaler 134 may increase a rate at which image data is transmitted to the host chip 220 and/or increase FPS when the host chip 220, 220a transmits an image to another electronic device. The downscaler 134 may transmit the decimated image to the third ISP 135 or a signal from the third ISP 135 may by output through the downscaler 134.

The third ISP 135 may perform image processing that has not been performed by the second ISP 133. As an example, when bad pixel correction has been performed by the second ISP 133, the third ISP 135 may perform lens shading correction and noise canceling. As an example, when bad pixel correction and lens shading correction have been performed by the second ISP 133, the third ISP 135 may perform noise canceling. As an example, when lens shading correction and noise canceling have been performed by the second ISP 133, the third ISP 135 may perform bad pixel correction. As an example, when lens shading correction has been performed by the second ISP 133, the third ISP 135 may perform bad pixel correction and noise canceling. In addition to this, the third ISP 135 and the second ISP 133 may perform the same image processing.

The third ISP 135 may transmit the image which has gone through at least one of bad pixel correction, lens shading correction, and noise canceling to the output interface 136. The output interface 136 may convert the input image into a data signal appropriate for transmission and transmit the converted data signal to the signal output unit 150. The signal output unit 150 may transmit the data signal input from the output interface 136 to the host chip 220. The converted data signal may be transmitted to the host chip 220 and may also be stored in the memory 140 by the signal processor 130. Alternatively, the third ISP 135 may be output to a display device and/or communication module, either directly or through the downscaler 134.

The host chip 220, 220a may convert the data signal input from the image sensor 100 into an image and display the image through a display. The host chip 220, 220a may transmit the data signal input from the image sensor 100 to another electronic device through a communication module.

The host chip 220, 220a may store the data signal input from the image sensor 100 in a separate memory. The host chip 220, 220a may load the data signal stored in the memory 140 and display the data signal through the display or transmit the data signal to another electronic device through the communication module.

Figure 10:
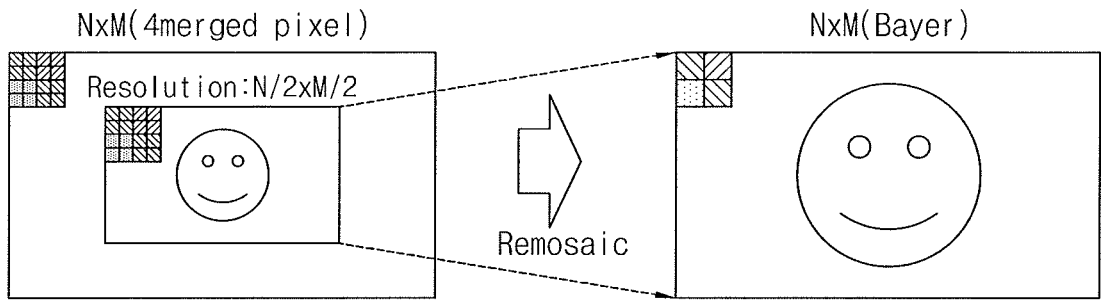
FIG. 10 illustrates an example of zooming in on an image by remosaicing 4-merged pixel patterns with Bayer pixel patterns.

FIG. 10 shows an example of zooming in on an image by remosaicing 4-merged pixel patterns with Bayer pixel patterns.

Referring to FIGS. 1A, 1B, 2A, 2D, and 10, the pixel array 120 may be composed of 4-merged pixels in each of which four unit pixels including the same color filter are disposed to neighbor each other. The pixel array 120 may generate a first image (e.g., a 4-merged pixel image) having a resolution of N/2×M/2 by cropping a part of a full resolution image. The first image (e.g., a 4-merged pixel image) may be a normal mode image or a zoom-in mode image. The first image (e.g., a 4-merged pixel image) generated by the pixel array 120 may be transmitted to the signal processor 130 or 130a.

The first ISP 131 may perform at least one of ADLC, bad pixel correction, and lens shading correction on the input first image (e.g., a 4-merged pixel image). The first ISP 131 may transmit the first image (e.g., a 4-merged pixel image) which has gone through image processing to the remosaic processor 132.

The remosaic processor 132 may convert the first image (e.g., a first image of 4-merged pixels) having a resolution of N/2×M/2 into a second image of Bayer pixels (e.g., a single-pixel image) having a resolution of N×M by remosaicing the first image. Since the remosaic processor 132 converts the first image (e.g., a 4-merged pixel image) into the second image of Bayer pixels (e.g., a single-pixel image) by remosaicing the first image once, the image may be zoomed-in on twice without degrading resolution. The image which has been zoomed-in twice by the remosaic processor 132 may be processed through the second ISP 133, the third ISP 135, the output interface 136, and the signal output unit 150 and transmitted to the host chip 220. Alternatively, the image that has been processed through the first and second ISPs 131 and 133 may be zoomed-in twice by the remosaic processor 132, processed by the third ISP 135, and output to the display device or the communication module.

Figure 11A:
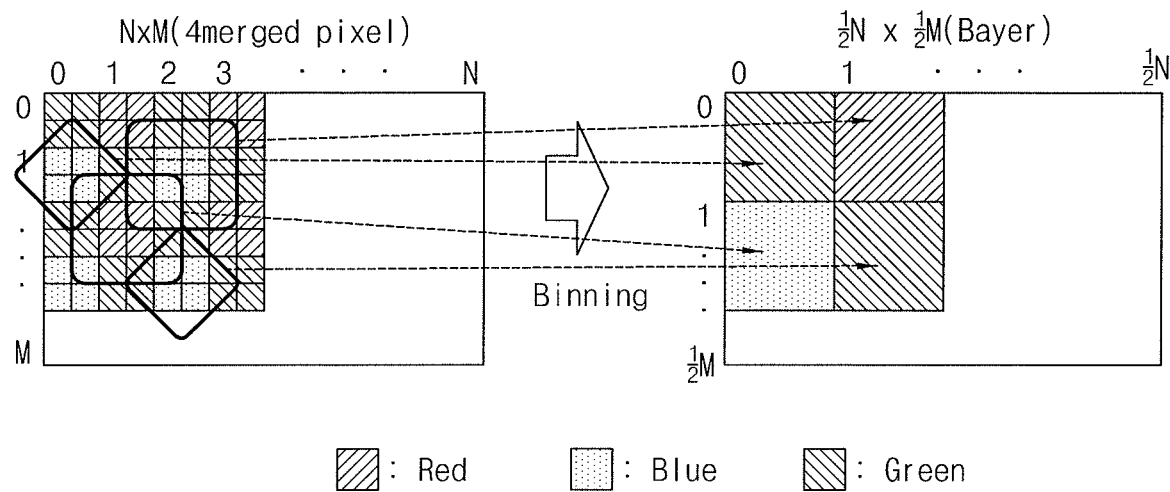
FIGS. 11A and 11B illustrate an example of zooming out on an image by binning 4-merged pixel patterns into ½N× ½M Bayer pixel patterns.
Figure 11B:
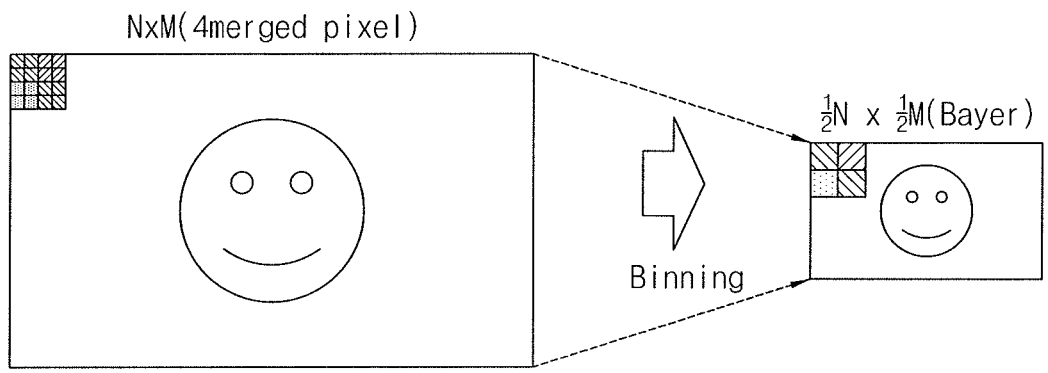

FIGS. 11A and 11B show an example of zooming out on an image by binning 4-merged pixel patterns into ½N×½M Bayer pixel patterns.

Referring to FIGS. 1A, 1B, 11A, and 11B, the pixel array 120 may be composed of N×M merged pixels (e.g., 4-merged pixels) in each of which N×M (e.g., four) unit pixels including the same color filter neighbor each other. The pixel array 120 may generate a first image (e.g., a 4-merged pixel image) having a resolution of N×M by cropping a part of a full resolution image. The first image (e.g., a 4-merged pixel image) may be a normal mode image or a zoom-out mode image. The first image (e.g., a 4-merged pixel image) generated by the pixel array 120 may be transmitted to the signal processor 130 or 130a.

The first ISP 131 may perform at least one of ADLC, bad pixel correction, and lens shading correction on the input first image (e.g., a 4-merged pixel image). The first ISP 131 may transmit the first image (e.g., a 4-merged pixel image) which has gone through image processing to the remosaic processor 132.

The remosaic processor 132 may convert the first image (e.g., a first image of 4-merged pixels) having a resolution of N×M into a second image of Bayer pixels (e.g., a single-pixel image) having a resolution of ½N×½M by binning the first image. In an arrangement structure of N×M merged pixels (e.g., 4-merged pixels), a ratio of red pixels including red color filters, blue pixels including blue color filters, and green pixels including green color filters may be 1:1:2.

As an example, the remosaic processor 132 may extract red color image data from four neighboring red color merged pixels (4-merged pixels). The remosaic processor 132 may merge the extracted four pieces of red color image data into a single red color image. The remosaic processor 132 may extract blue color image data from four neighboring blue color merged pixels (4-merged pixels). The remosaic processor 132 may merge the extracted four pieces of blue color image data into a single blue color image. The remosaic processor 132 may extract green color image data from four neighboring green color merged pixels (4-merged pixels). The remosaic processor 132 may merge the extracted four pieces of green color image data into a single green color image.

The remosaic processor 132 may extract red color image data from each of four neighboring 4-merged pixels and merge the extracted four pieces of red color image data into one piece of red color data. In the same way, the remosaic processor 132 may extract blue color image data from each of four neighboring 4-merged pixels and merge the extracted four pieces of blue color image data into one piece of blue color data. In the same way, the remosaic processor 132 may extract green color image data from each of four neighboring 4-merged pixels and merge the extracted four pieces of green color image data into one piece of green color data.

Since the remosaic processor 132 converts the first image (e.g., a 4-merged pixel image) into the second image of Bayer pixels (e.g., a single-pixel image) by binning the first image once, the image may be zoomed-out ½ times without degrading resolution. The image which has been zoomed-out ½ times by the remosaic processor 132 may be processed through the second ISP 133, the downscaler 134, the third ISP 135, the output interface 136, and the signal output unit 150 and transmitted to the host chip 220.

Alternatively, the image that has been processed through the first ISP 131 maybe provided to the host chip 220a. Then the image may be processed by the second ISP 133, and then may be zoomed-out ½ times by the remosaic processor 132 in the image processor 230, which is then processed by the third ISP 135 and output to the display device or the communication module though the downscaler 134.

Figure 12:
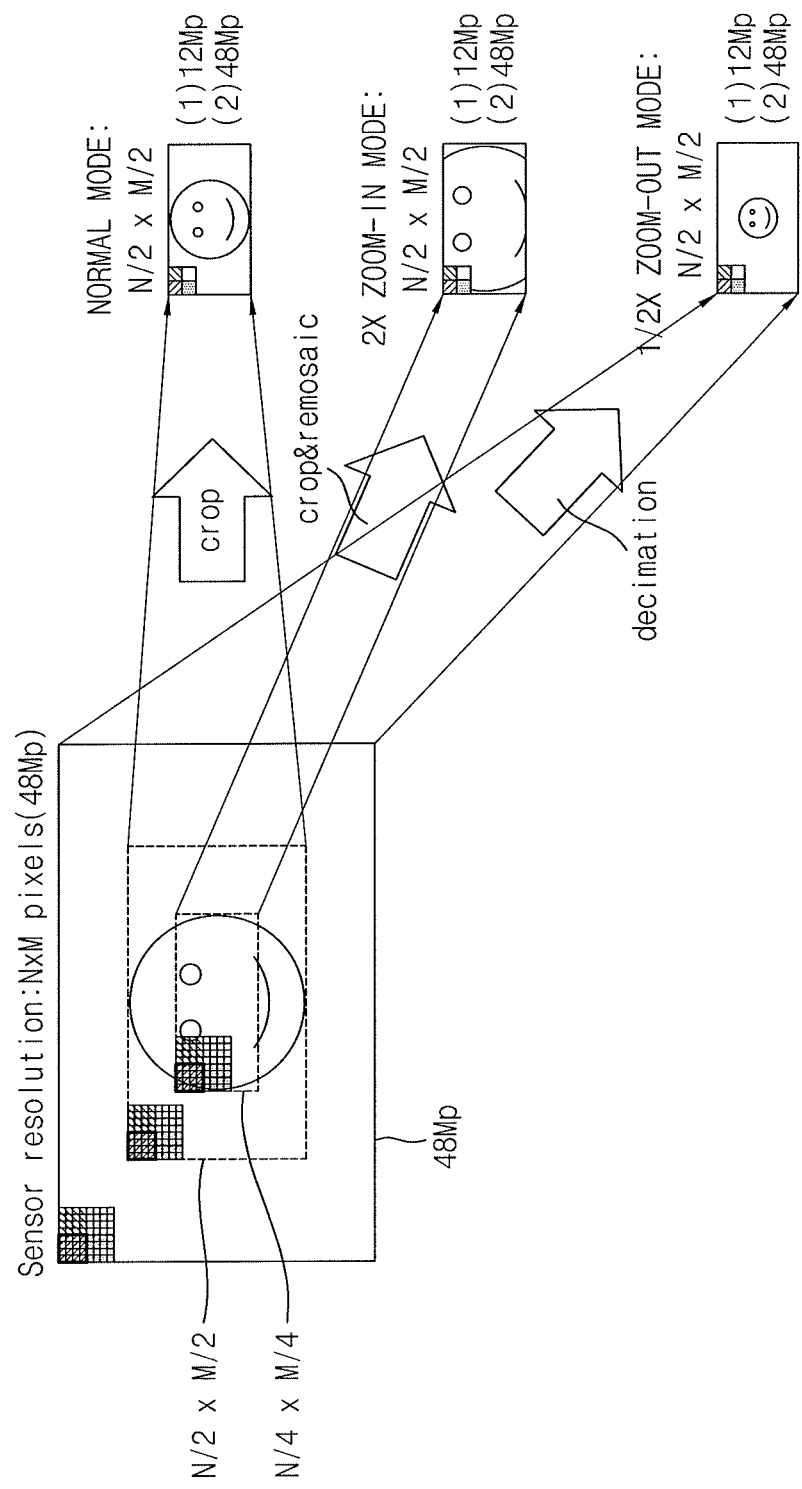
FIG. 12 illustrates an example in which an image sensor having an N×M-merged pixel structure generates normal mode, zoom-in mode, and zoom-out mode images.

FIG. 12 shows an example in which an image sensor having a 4-merged pixel structure generates normal mode, zoom-in mode, and zoom-out mode images. Referring to FIGS. 1A, 1B, and 12, the pixel array 120 may be composed of N×M merged pixels in each of which N×M unit pixels including the same color filter are disposed to neighbor each other.

As an example, the pixel array 120 may include N×M merged pixels corresponding to a resolution of 12 MP (4,000×3,000). When all the merged pixels of the pixel array 120 are driven to generate a full resolution image, a 12 MP image may be generated.

As an example, the pixel array 120 may include N×M merged pixels corresponding to a resolution of 48 MP. When all the merged pixels of the pixel array 120 are driven to generate a full resolution image, a 48 MP image may be generated.

Merged pixels may have any desired resolution. For example, the pixel array 120 may include N×M merged pixels corresponding to a resolution of 3 MP, 6 MP, 24 MP, 48 MP, 96 MP, 108 MP, 1200 MP, 2400 MP, 4800 MP, or 9600 MP. When all the merged pixels of the pixel array 120 are driven to generate a full resolution image, 3 MP, 6 MP, 24 MP, 48 MP, 96 MP, 108 MP, 1200 MP, 2400 MP, 4800 MP, 9600 MP, etc., images may be generated.

Generation of Normal Mode Image

For example, the pixel array 120 may generate a normal mode image of 12 MP by cropping ¼ of the full resolution image of 48 MP on the basis of the center of the full resolution image. Among all the 4-merged pixels of the pixel array 120, ¼ of the 4-merged pixels based on the center may be driven to generate a normal mode image of 12 MP.

For example, the pixel array 120 may transmit the full resolution image of 48 MP to the signal processor 130 or 130*a*. The signal processor 130 may generate a normal mode image of 12 MP by cropping ¼ of the full resolution image of 48 MP on the basis of the center.

For example, the pixel array 120 may transmit the full resolution image of 48 MP to the signal processor 130 or 130*a*. The signal processor 130 may crop ¼ of the full resolution image of 48 MP on the basis of the center. The signal processor 130 or 130*a* may generate a normal mode image of 48 MP by rearranging the cropped image to correspond to all the pixels.

Generation of Zoom-In Mode Image

For example, the pixel array 120 may generate a zoom-in mode image by cropping 1/16 of the full resolution image of 48 MP on the basis of the center of the full resolution image. Among all the N×M merged pixels of the pixel array 120, 1/16 of the merged pixels based on the center may be driven to generate a zoom-in mode image.

For example, the pixel array 120 may transmit the full resolution image of 48 MP to the signal processor 130. The signal processor 130 may generate a zoom-in mode image of 3 MP (2,000×1,500) by cropping 1/16 of the full resolution image of 48 MP on the basis of the center.

The remosaic processor 132 may convert the zoom-in mode image of 3 MP into a Bayer pixel image (e.g., a single-pixel image) of 12 MP by remosaicing the zoom-in mode image, e.g., the 12 MP image having merged pixels each including a k*l matrix of a same color, may be remosaiced into a 3MP image having pixels including having a p*q matrix of the same color, wherein p is a non-negative integer that is less than k and q is a non-negative integer less than 1, the p*q matrixes being arranged in a Bayer pattern. Since the remosaic processor 132 converts the zoom-in mode image of 3 MP into the Bayer pixel image (e.g., a single-pixel image) of 12 MP by remosaicing the zoom-in mode image once, the image may be zoomed-in on twice without degrading resolution. The image which has been zoomed-in twice by the remosaic processor 132 may be processed through the second ISP 133, the third ISP 135, the output interface 136, and the signal output unit 150, and transmitted to the host chip 220.

For example, the pixel array 120 may transmit the full resolution image of 48 MP to the signal processor 130 or 130*a*. The signal processor 130 or 130*a* may crop 1/16 of the full resolution image of 48 MP on the basis of the center. The signal processor 130 or 130*a* may generate a normal mode image of 48 MP by rearranging the cropped image to correspond to all the pixels. First, the remosaic processor 132 may convert a zoom-in mode image of 3 MP image into a Bayer pixel image of 12 MP (e.g., a single pixel image) by remosaicing the zoom-in mode image. Secondly, the remosaic processor 132 may convert the Bayer pixel image of 12 MP image into a Bayer pixel image of 48 MP (e.g., a single pixel image) by remosaicing the Bayer pixel image of 12 MP. For example, the 48 MP image may have pixels including having a r*s matrix of the same color, wherein r is a non-negative integer that is less than p and s is a non-negative integer less than q, the r*s matrix being arranged in a Bayer pattern In this way, the image may be zoomed-in on two to four times without degrading resolution. The image which has been zoomed-in two to four times by the remosaic processor 132 may be processed through the second ISP 133, the third ISP 135, the output interface 136, and the signal output unit 150, and transmitted to the host chip 220.

Alternatively, the image which has been zoomed-in two to four times by the remosaic processor 132 in the image processor 230 may be output to the display or the communication module.

Generation of Zoom-Out Mode Image

For example, the pixel array 120 may generate a zoom-out mode image of 48 MP by driving all the N×M-merged pixels of the pixel array 120. The zoom-out mode image may be identical to the full resolution image of the pixel array 120. Since the zoom-out mode image of 48 MP has a large data size, it may be difficult to transmit the data.

For example, the remosaic processor 132 may zoom-out on the zoom-out mode image of 48 MP ½ times by binning the zoom-out mode image. Binning by the remosaic processor 132 may reduce the data size of the zoom-out mode image to the same level as that (12 MP) of the normal mode image.

For example, the downscaler 134 may decimate the zoom-out mode image of 48 MP. The downscaler 134 may reduce the data size of the zoom-out mode image to the same level as that (12 MP) of the normal mode image. A data size is not limited thereto, and the signal processor 130 or the image processor 230 may output the zoom-out mode image of 48 MP without reducing the size.

The signal processor 130 may zoom-out on the zoom-out mode image ½ times without degrading resolution. The image which has been zoomed-out ½ times by the remosaic processor 132 may be processed through the second ISP 133, the third ISP 135, the output interface 136, and the signal output unit 150 and transmitted to the host chip 220.

Alternatively, the image that has been processed through the first and second ISPs 131 and 133 may be zoomed-out ½ times by the remosaic processor 132 in the image processor 230, which is then processed by the third ISP 135 and output to the display device or the communication module, either directly or through the downscaler 134.

As shown in FIG. 12, the image sensor 100 and the electronic device 10 may generate a normal mode image, a zoom-in mode image, or a zoom-out mode image according to a zoom mode signal input through the user interface 210. The image sensor 100 and the electronic device 10 may generate a normal mode image, a zoom-in mode image, or a zoom-out mode image without a normal mode lens, a zoom-in mode lens, and a zoom-out mode lens. The image sensor 100 and the electronic device 10 may generate a normal mode image, a zoom-in mode image, or a zoom-out mode image without degrading resolution.

As an example, the image sensor 100 and the electronic device 10 may generate a normal mode image, a zoom-in mode image, or a zoom-out mode image having the same data size of 12 MP from the full resolution image of 48 MP. As an example, the image sensor 100 and the electronic device 10 of may generate a normal mode image, a zoom-in mode image, or a zoom-out mode image having the same data size of 48 MP from the full resolution image of 48 MP. Thus, all displayed images may have a same resolution regardless of mode.

Figure 13:
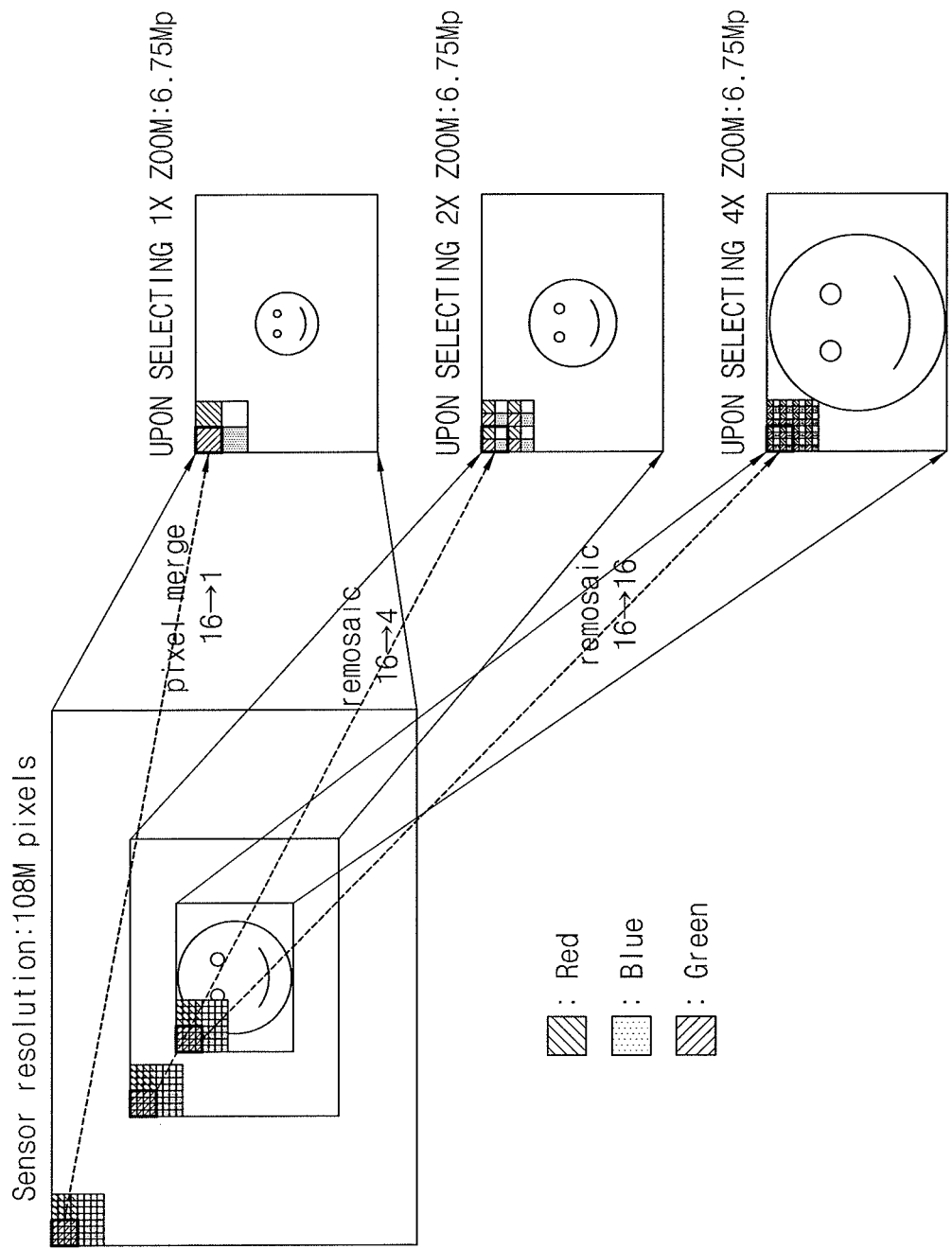
FIG. 13 illustrates an example in which an image sensor having a an N×M-merged pixel structure zooms in on an image one, two, and four times without increasing the size of an image file.

FIG. 13 shows an example in which an image sensor having an N×M-merged pixel structure zooms in on an image one, two, and four times without increasing the size of an image file. Referring to FIGS. 1A, 1B, 2, and 13, the pixel array 120 may be composed of N×M merged pixels (e.g., 16-merged pixels) in each of which N×M unit pixels (e.g., 16 unit pixels) including the same color filter neighbor each other.

As an example, the pixel array 120 may include 16-merged pixels corresponding to a resolution of 108 MP. When all the 16-merged pixels of the pixel array 120 are driven to generate a full resolution image, a 108 MP image may be generated.

Generation of Normal Mode Image

The pixel array 120 may transmit the full resolution image of 108 MP to the signal processor 130. The signal processor 130 may generate a normal mode image of 6.75 MP by merging pixels of the full resolution image of 108 MP into 1/16 the number of pixels. A data size is not limited thereto, and the signal processor 130 may generate a normal mode image of 108 MP without changing the size of the full resolution image of 108 MP.

The signal processor 130 may perform image processing on the full resolution image using the first ISP 131 and then generate a normal mode image by merging pixels of the full resolution image into 1/16 the number of pixels. The signal processor 130 may perform image processing on the normal mode image whose pixels have merged into 1/16 the number of pixels using the second ISP 133 and the third ISP 135 and transmit the processed normal mode image to the output interface 136. The output interface 136 may convert the normal mode image into a data signal appropriate for transmission and transmit the converted data signal to the signal output unit 150. The signal output unit 150 may transmit the data signal input from the output interface 136 to the host chip 220. The converted data signal may be transmitted to the host chip 220 and may also be stored in the memory 140 by the signal processor 130.

Alternatively, the signal processor 130*a* may perform image processing on the full resolution image using the first ISP 131 and then generate a normal mode image by merging pixels of the full resolution image into 1/16 the number of pixels and output this to the host chip 220*a*. The image processor 230 may perform image processing on the normal mode image whose pixels have merged into 1/16 the number of pixels using the second ISP 133 and the third ISP 135, and may transmit the processed normal mode data signal to the display device or the communication module.

Generation of 2× Zoom-In Mode Image

The pixel array 120 may generate a zoom-in mode image by cropping ¼ of the full resolution image of 108 MP on the basis of the center of the full resolution image. Among all the 16-merged pixels of the pixel array 120, ¼ of the 16-merged pixels based on the center may be driven to generate a zoom-in mode image. Subsequently, the signal processor 130 may generate a 2× zoom-in mode image. The remosaic processor 132 may convert the zoom-in mode image into a 4-merged pixel image by remosaicing the zoom-in mode image. As a result, a zoom-in mode image of 16-merged pixels may be generated from the full resolution image of 108 MP. Subsequently, a 2× zoom-in mode image of 6.75 MP may be generate by converting the zoom-in mode image of 16-merged pixels into a 4-merged pixel image. A data size is not limited thereto, and the signal processor 130 may generate a 2× zoom-in mode image of 108 MP without changing the size of the full resolution image of 108 MP.

A zoom-in mode image may be generated by cropping ¼ of the full resolution image of 108 MP on the basis of the center of the full resolution image and then image-processed by the first ISP 131. After that, the remosaic processor 132 may remosaic the zoom-in mode image. Subsequently, the 2× zoom-in mode image which has been remosaiced may be image-processed by the second ISP 133 and the third ISP 135 and transmitted to the output interface 136. The output interface 136 may convert the processed 2× zoom-in mode image into a data signal appropriate for transmission and transmit the converted data signal to the signal output unit 150. The signal output unit 150 may transmit the data signal input from the output interface 136 to the host chip 220. The converted data signal may be transmitted to the host chip 220 and may also be stored in the memory 140 by the signal processor 130.

Alternatively, the output of the first ISP 131 of the signal processor 130*a* may be provided to the host chip 220*a*. The image processor 230 may generate 2× zoom-in mode image using the second ISP 133, the remosaic processor 132, and the third ISP 135, and transmit the 2× zoom-in mode data signal to the display device or the communication module.

Generation of 4× Zoom-In Mode Image

The pixel array 120 may generate a zoom-in mode image by cropping 1/16 of the full resolution image of 108 MP on the basis of the center of the full resolution image. Among all the 16-merged pixels of the pixel array 120, 1/16 of the 16-merged pixels based on the center may be driven to generate a zoom-in mode image. Subsequently, the signal processor 130 may generate a 2× zoom-in mode image. The remosaic processor 132 may convert the zoom-in mode image into a Bayer pixel image (a single-pixel image) by remosaicing the zoom-in mode image. As a result, a zoom-in mode image of 16-merged pixels may be generated from the full resolution image of 108 MP. Subsequently, a 4× zoom-in mode image of 6.75 MP may be generated by converting the zoom-in mode image of 16-merged pixels into a Bayer pixel image (a single pixel image). A data size is not limited thereto, and the signal processor 130 may generate a 4× zoom-in mode image of 108 MP without changing the size of the full resolution image of 108 MP.

A zoom-in mode image may be generated by cropping 1/16 of the full resolution image of 108 MP on the basis of the center of the full resolution image and then image-processed by the first ISP 131. After that, the remosaic processor 132 may remosaic the zoom-in mode image. Subsequently, the 4× zoom-in mode image which has been remosaiced may be image-processed by the second ISP 133 and the third ISP 135 and transmitted to the output interface 136. The output interface 136 may convert the processed 4× zoom-in mode image into a data signal appropriate for transmission and transmit the converted data signal to the signal output unit 150. The signal output unit 150 may transmit the data signal input from the output interface 136 to the host chip 220. The converted data signal may be transmitted to the host chip 220 and may also be stored in the memory 140 by the signal processor 130.

Alternatively, the output of the first ISP 131 of the signal processor 130*a* may be provided to the host chip 220*a*. The image processor 230 may generate 4× zoom-in mode image using the second ISP 133, the remosaic processor 133, and the third ISP 135, and transmit the 4× zoom-in mode data signal to the display device or the communication module.

As shown in FIG. 13, the image sensor 100 and the electronic device 10 or 10' may generate a normal mode image or a zoom-in mode image according to a zoom mode signal input through the user interface 210 or the illuminance sensor 160. The image sensor 100 and the electronic device 10 or 10' may generate a normal mode image or a zoom-in mode image without a normal mode lens nor a zoom-in mode lens. The image sensor 100 and the electronic device 10 or 10' may generate a normal mode image or a zoom-in mode image without degrading resolution. The image sensor 100 and the electronic device 10 or 10' may generate a normal mode image, a 2× zoom-in mode image, or a 4× zoom-in mode image having the same data size of 6.75 MP from the full resolution image of 108 MP.

Embodiments may be described, and illustrated in the drawings, in terms of functional blocks, units, modules, and/or methods. Those skilled in the art will appreciate that these blocks, units, modules, and/or methods are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, modules, and/or methods being implemented by microprocessors or similar, they may be programmed using software (e.g., microcode) to perform various functions discussed herein and may optionally be driven by firmware and/or software. Alternatively, each block, unit, module, and/or method may be implemented by dedicated hardware, or as a combination of dedicated hardware to perform some functions and a processor (e.g., one or more programmed microprocessors and associated circuitry) to perform other functions. Also, each block, unit, and/or module of the embodiments may be physically separated into two or more interacting and discrete blocks, units and/or modules without departing from the scope of the disclosure. Further, the blocks, units and/or modules of the embodiments may be physically combined into more complex blocks, units and/or modules without departing from the scope of the disclosure.

According to the example embodiments, a normal mode image or a zoom-in mode image according to a zoom mode signal input through a user interface may be generated. According to the example embodiments, a normal mode image or a zoom-in mode image may be generated without a normal mode lens nor a zoom-in mode lens. According to the example embodiments, a normal mode image or a zoom-in mode image may be generated without degradation of resolution.

According to the example embodiments, a normal mode image, a double zoom-in mode image, or a quadruple zoom-in mode image having the same data size may be generated.

According to the example embodiments, a normal mode image, a zoom-in mode image, or a zoom-out mode image having the same data size may be generated.

The example embodiments are directed to providing an image sensor capable of implementing zoom-in and zoom-out without employing a lens, e.g., implemented electronically, a method of driving the image sensor, and an electronic device including the image sensor. In addition, the example embodiments are directed to providing an image sensor capable of implementing zoom-in and zoom-out without employing a plurality of image sensors, e.g., using a single image sensor, a method of driving the image sensor, and an electronic device including the image sensor. Further, the example embodiments are directed to providing an image sensor capable of implementing zoom-in and zoom-out without degrading resolution, a method of driving the image sensor, and an electronic device including the image sensor.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present invention as set forth in the following claims.

What is claimed is:

1. An image sensor, comprising:
a pixel array having an N×M array of merged pixels arranged in a Bayer pattern, each merged pixel including a k*l matrix of unit pixels of a same color, where k and l are integers greater than two;
an image signal processor to process signals output by the array of merged pixels in accordance with a normal mode or a zoom-in mode; and
a remosaic processor, wherein, in the zoom-in mode, the remosaic processor is to remosaic the pixel array such that signals corresponding to the unit pixels are arranged in a p*q matrix of unit pixels of a same color, wherein p is a non-negative integer that is less than k and q is a non-negative integer less than l, the p*q matrix being arranged in a Bayer pattern.

2. The image sensor as claimed in claim 1, wherein, in the normal mode, the image signal processor is to crop an image output by the pixel array.

3. The image sensor as claimed in claim 1, wherein an image in the normal mode and an image in the zoom-in mode have a same resolution, the same resolution being less than N×M.

4. The image sensor as claimed in claim 3, wherein p and q are determined such that the image in the normal mode and the image in the zoom-in mode have the same resolution.

5. The image sensor as claimed in claim 1, wherein a number of Bayer patterns in zoom-in mode corresponding to a single Bayer pattern of the N×M array of merged pixels equals (k*l)/(p*q).

6. The image sensor as claimed in claim 1, further comprising a further zoom-in mode, wherein, in the further zoom-in mode, signals from the pixel array are remosaiced such that signals corresponding to the unit pixels are arranged in a r*s matrix of unit pixels of a same color, wherein r is a non-negative integer that is less than p and s is a non-negative integer less than q, the r*s matrix being arranged in a Bayer pattern.

7. The image sensor as claimed in claim 6, wherein an image in the normal mode, an image in the zoom-in mode, and an image in the further zoom-in mode have a same resolution.

8. The image sensor as claimed in claim 1, wherein the image signal processor is to further process signals in accordance with a zoom-out mode.

9. The image sensor as claimed in claim 8, wherein an image in the normal mode, an image in the zoom-in mode, and an image in the zoom-out mode have a same resolution, the same resolution being less than or equal to N×M.

10. The image sensor as claimed in claim 8, wherein, in the zoom-out mode, the image signal processor is to output signals having a resolution of N/2×M/2.

11. The image sensor as claimed in claim 10, wherein, in the zoom-out mode, the image signal processor is remosaic signals from the pixel array such that signals corresponding to the unit pixels are arranged in a $k^2*l^2$ matrix of unit pixels of a same color.

12. The image sensor as claimed in claim 10, wherein, in the zoom-out mode, the image signal processor is to bin signals from the pixel array such that signals are arranged in an N/2×M/2 matrix.

13. The image sensor as claimed in claim 1, wherein, in the normal mode, each merged pixel includes the k*l matrix of unit pixels of a same color.

14. The image sensor as claimed in claim 1, wherein, in the normal mode or the zoom-in mode, an image is cropped from the N×M array of merged pixels.

15. The image sensor as claimed in claim 1, wherein p and q are both 1.

16. An electronic device, comprising:
a pixel array having an N×M array of merged pixels arranged in a Bayer pattern, each merged pixel including a k*l matrix of unit pixels of a same color, where k and l are integers greater than two;
a signal processor to process signals output by the array of merged pixels in accordance with a normal mode or a zoom-in mode; and
a remosaic processor, wherein, in the zoom-in mode, the remosaic processor is to remosaic the pixel array such that signals corresponding to the unit pixels are arranged in a p*q matrix of unit pixels of a same color, wherein p is a non-negative integer that is less than k and q is a non-negative integer less than l, the p*q matrix being arranged in a Bayer pattern.

17. The electronic device as claimed in claim 16, wherein the remosaic processor is outside the signal processor.

18. The electronic device as claimed in claim 16, wherein the remosaic processor is internal to the signal processor.

19. A method of image zoom processing of an image sensor including a pixel array, the method comprising:
driving a plurality of merged pixels in the pixel array to generate a full resolution image;
processing signals output by the pixel array, having an N×M array of merged pixels arranged in a Bayer pattern, each merged pixel including a k*l matrix of unit pixels of a same color, where k and l are integers greater than two, in accordance with a normal mode or a zoom-in mode; and
remosaicing, in the zoom-in mode, signals from the pixel array such that signals corresponding to the unit pixels are arranged in a p*q matrix of unit pixels of a same color, wherein p is a non-negative integer that is less than k and q is a non-negative integer less than l, the p*q matrix being arranged in a Bayer pattern.

20. The method as claimed in claim 19, further comprising processing signals in accordance with a zoom-out mode, wherein an image in the normal mode, an image in the zoom-in mode, and an image in the zoom-out mode have a same resolution, the same resolution being less than or equal to N×M.

* * * * *